United States Patent
Kaneko

(10) Patent No.: US 7,975,268 B2
(45) Date of Patent: Jul. 5, 2011

(54) GRID COMPUTING SYSTEM, MANAGEMENT SERVER, PROCESSING SERVER, CONTROL METHOD, CONTROL PROGRAM AND RECORDING MEDIUM

(75) Inventor: Akihiro Kaneko, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/597,634

(22) PCT Filed: Feb. 15, 2005

(86) PCT No.: PCT/JP2005/002218
§ 371 (c)(1),
(2), (4) Date: Jan. 13, 2009

(87) PCT Pub. No.: WO2005/078581
PCT Pub. Date: Aug. 25, 2005

(65) Prior Publication Data
US 2009/0204694 A1    Aug. 13, 2009

(30) Foreign Application Priority Data

Feb. 18, 2004   (JP) ................................ 2004-041611

(51) Int. Cl.
*G06F 9/46* (2006.01)
*G06F 15/76* (2006.01)
(52) U.S. Cl. ............................ 718/100; 718/101; 712/28
(58) Field of Classification Search .......... 718/100–101; 712/28
See application file for complete search history.

(56) References Cited

U.S. PATENT DOCUMENTS

| | | | |
|---|---|---|---|
| 5,539,883 A | 7/1996 | Allon et al. | |
| 7,464,159 B2 * | 12/2008 | Di Luoffo et al. | 709/224 |
| 7,610,371 B2 * | 10/2009 | Enqvist | 709/224 |
| 2002/0019844 A1 | 2/2002 | Kurowski et al. | |

(Continued)

FOREIGN PATENT DOCUMENTS

JP   2001-325041   11/2001

(Continued)

OTHER PUBLICATIONS

Shoji Yarimizu; Grid Computing—Application in Business Fields The Present and Future of PC Grid; (Translator's summary); Job. No. 6335-109424.

(Continued)

*Primary Examiner* — Qing Wu
(74) *Attorney, Agent, or Firm* — Schmeiser, Olsen & Watts; John Pivnichny

(57) ABSTRACT

A method and system for performing a requested job. The system includes multiple processing servers and a management server. Each processing server executes an assigned program for performing the requested job. An execution direction, which identifies each of the multiple programs and an execution order for their execution (including identification of a first program to be executed), is generated. The management server sends to a first processing server the execution direction and input data. The first processing server: executes the first program using the input data, resulting in updating the input data; sends to the management server an inquiry for identification information that identifies a second processing server to execute a second program included in the execution direction; receives the identification information from the management server; and sends to the second processing server the execution direction and the updated input data for subsequent execution of the second program.

32 Claims, 17 Drawing Sheets

U.S. PATENT DOCUMENTS

| | | | |
|---|---|---|---|
| 2002/0198769 | A1 | 12/2002 | Ratcliff, III |
| 2003/0220960 | A1 | 11/2003 | Demoff et al. |
| 2004/0015977 | A1 | 1/2004 | Benke et al. |
| 2004/0225711 | A1* | 11/2004 | Burnett et al. ............. 709/201 |

FOREIGN PATENT DOCUMENTS

| | | |
|---|---|---|
| JP | 2002-73576 | 3/2002 |
| JP | 2003-204035 | 7/2003 |

OTHER PUBLICATIONS

Lee et al.; visPerf: Monitoring Tool for Grid Computing; Internet Citation, [Online] Jun. 2003, XP-002308033 Retrieved from the Internet: URL:http://icl.cs.utk.edu/projectsfiles/netsolve/pubs/visperf.pdf; 13 pages.

Czajkowski et al.; Grid Information Services for Distributed Resource Sharing; Proceedings of the International Symposium of High Performance Distributed Computing, Aug. 2001; pp. 1-14, XP-002308029.

Hitoshi Mimori, "Fukusu Computer o 1 System to shite Shuchu Seigyo", Nikkei Internet Technology, No. 59, Nikkei Business Publications, Inc., May 22, 2002, pp. 14-15, CSDB: CS-ND-2002-01062-003.

* cited by examiner

[Figure 1]
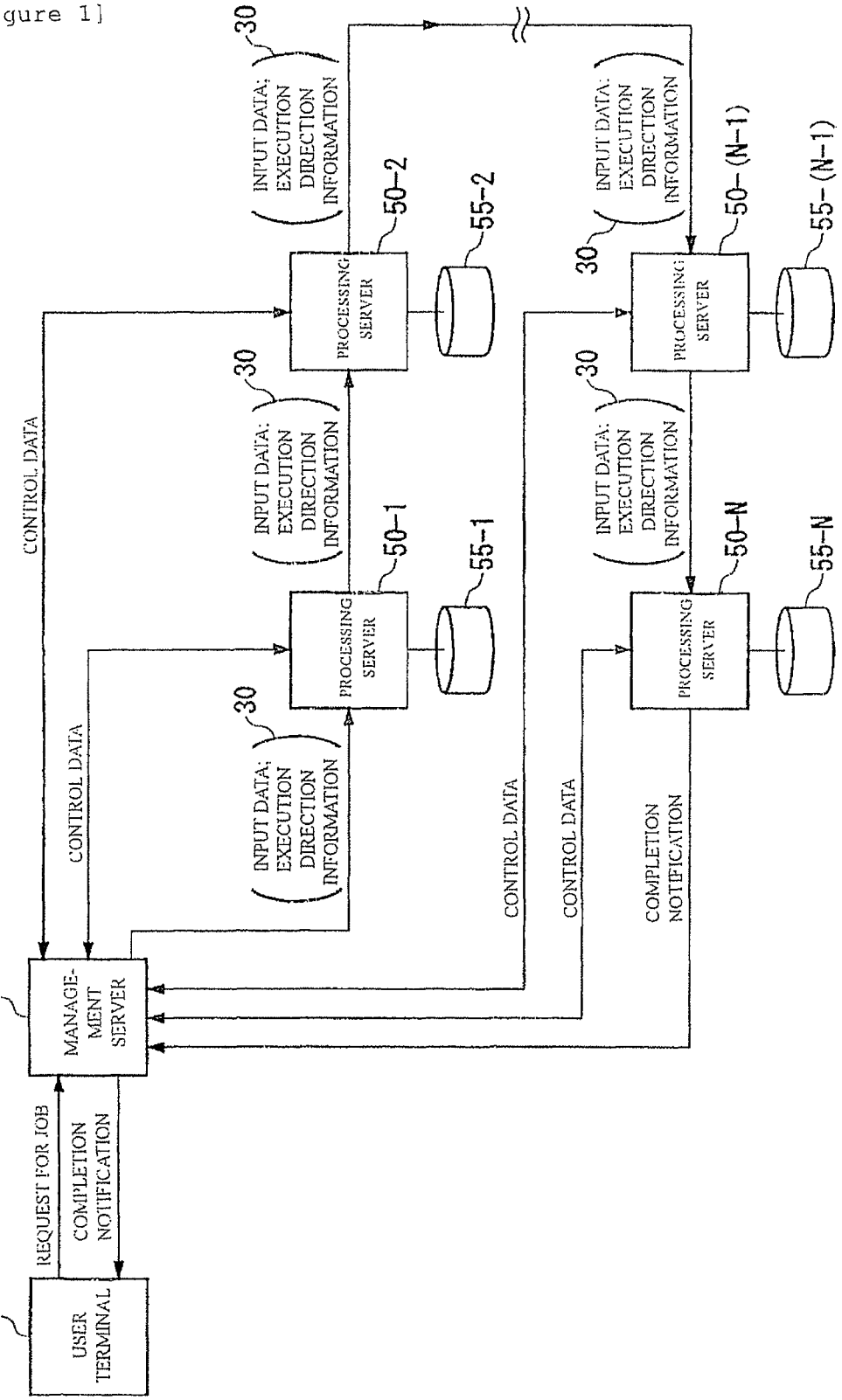

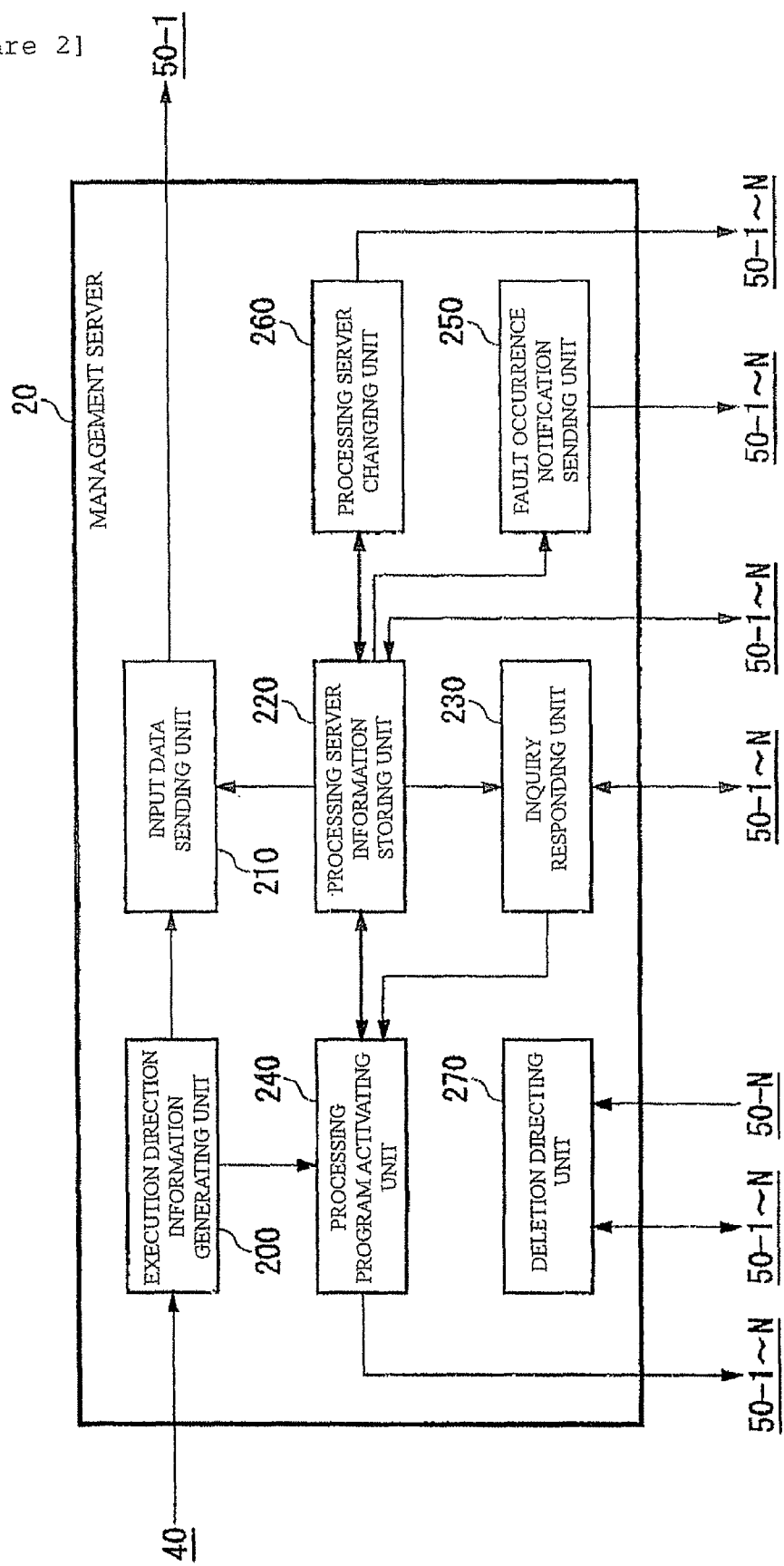
[Figure 2]

[Figure 3]
(a)
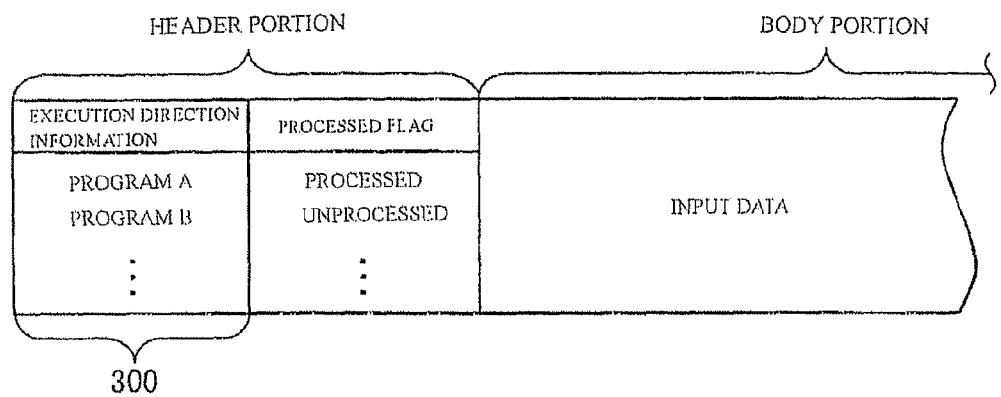
(b)
```
1:  //JOB01     JOB
2:  //STEP01    EXEC    Program= ProgramA
3:  //INdata    FILE    Filename=InfileA
4:  //OUTdata   FILE    Filename=OutfileA
5:  //STEP02    EXEC    Program= ProgramB
6:  //INdata    FILE    Filename=OutfileA
7:  //OUTdata   FILE    Filename=OutfileB
```

[Figure 4]

| PROCESSING SERVER ID | PROCESSING PROGRAM | | | EXECUTABILITY INFORMATION | MAXIMUM THROUGHPUT | USAGE RATE |
|---|---|---|---|---|---|---|
| | ID | NUMBER OF PROCESSINGS | LAST RECEIVING NOTIFICATION | | | |
| Node AA | A | 1 | 15:55 | | 55 | 95% |
| Node BB | B | 2 | 16:15 | | 50 | 60% |
| Node CC | A | 2 | 14:35 | | 55 | 95% |
| Node DD | A | 2 | 16:00 | — | 65 | 91% |
| Node EE | — | — | — | | 60 | 50% |
| ... | ... | ... | ... | ... | ... | ... |

220

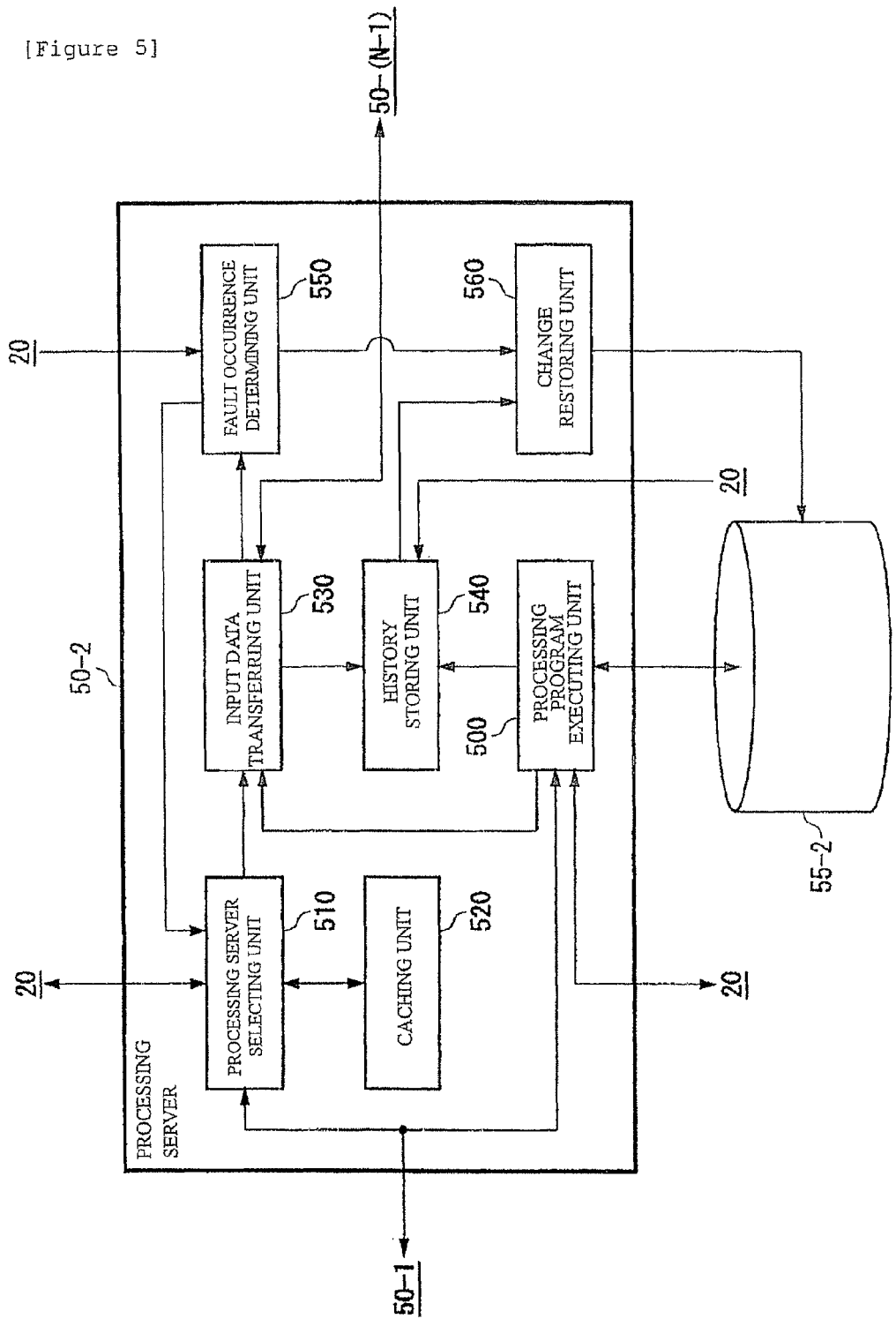
[Figure 5]

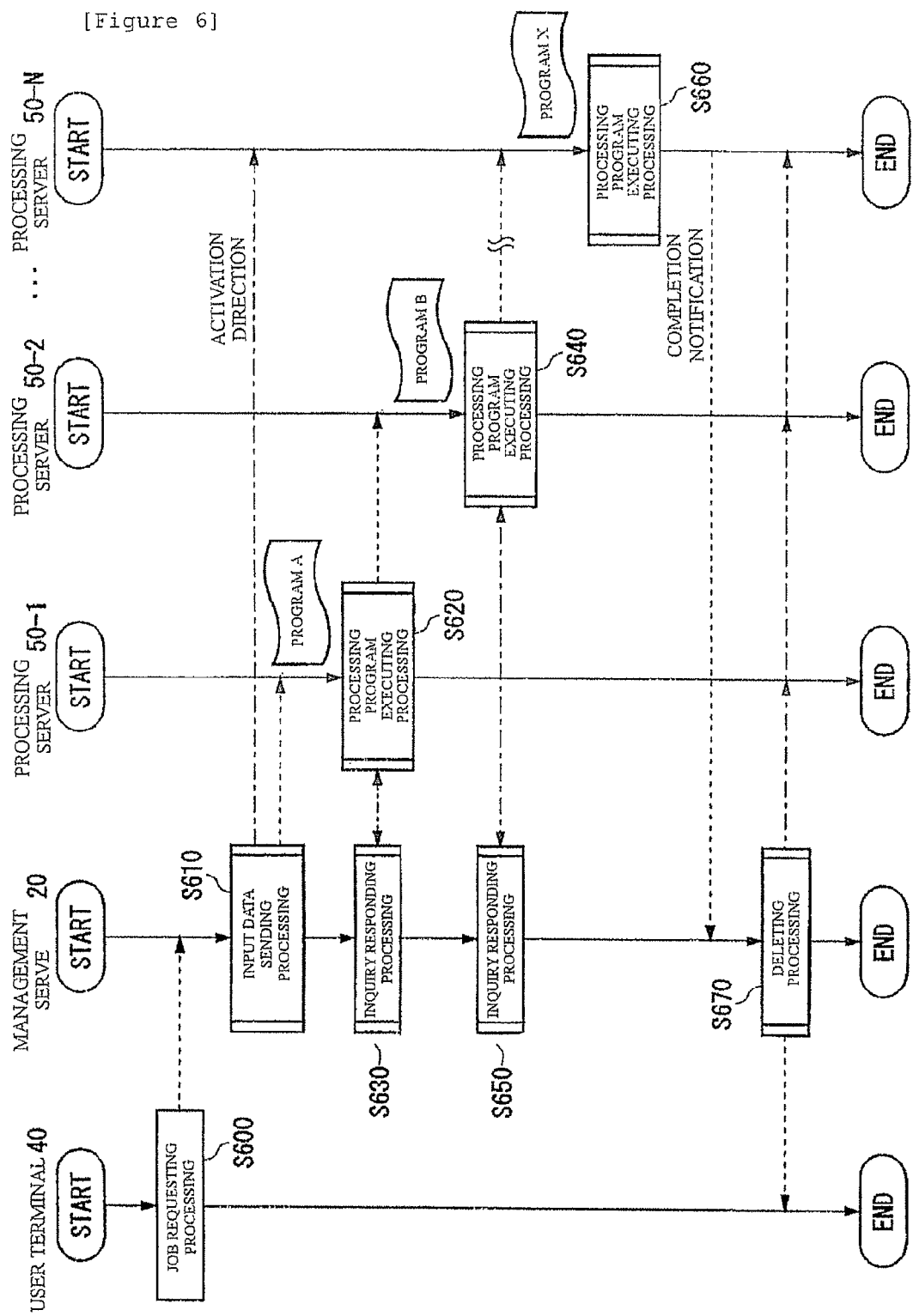

[Figure 7]
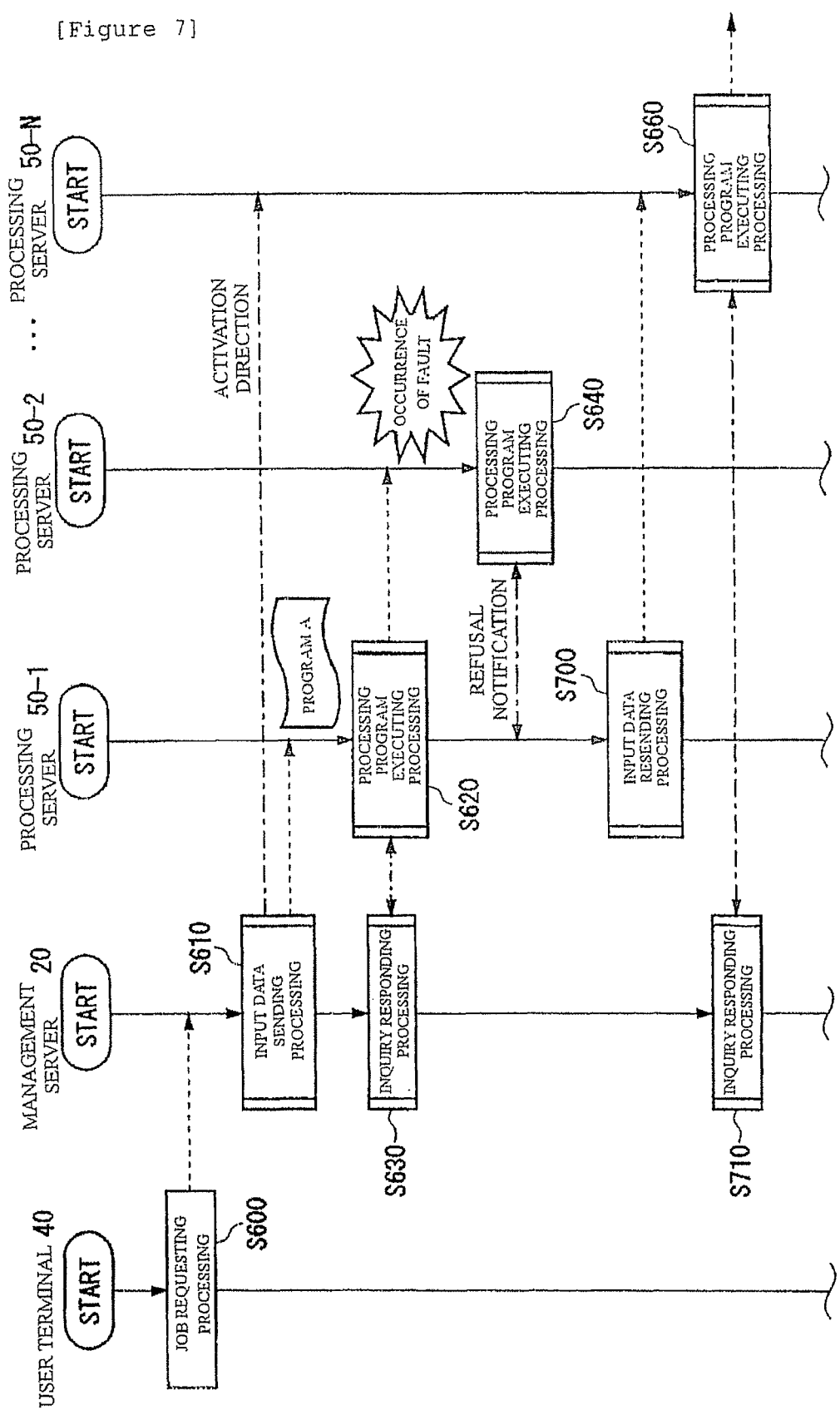

[Figure 8]
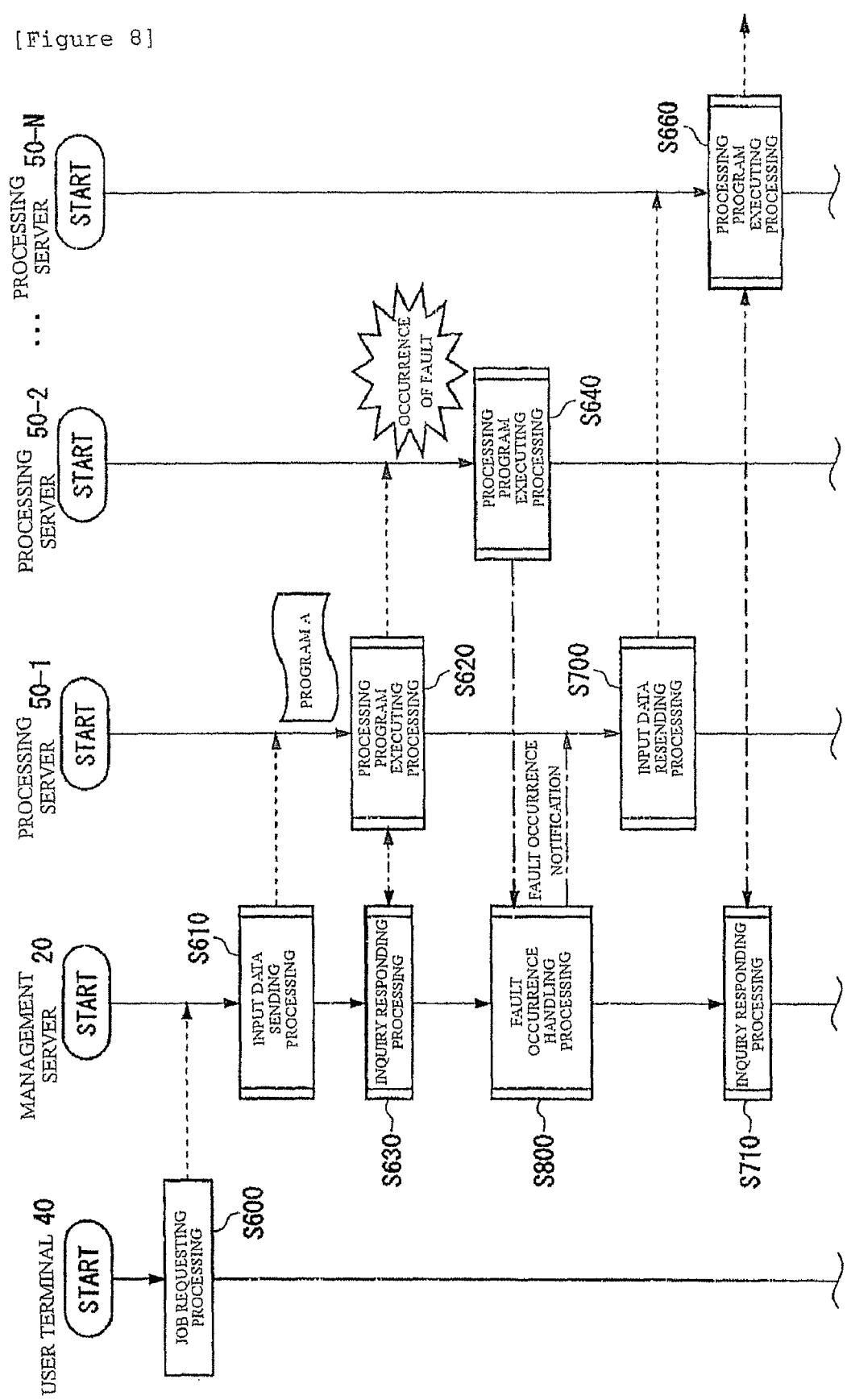

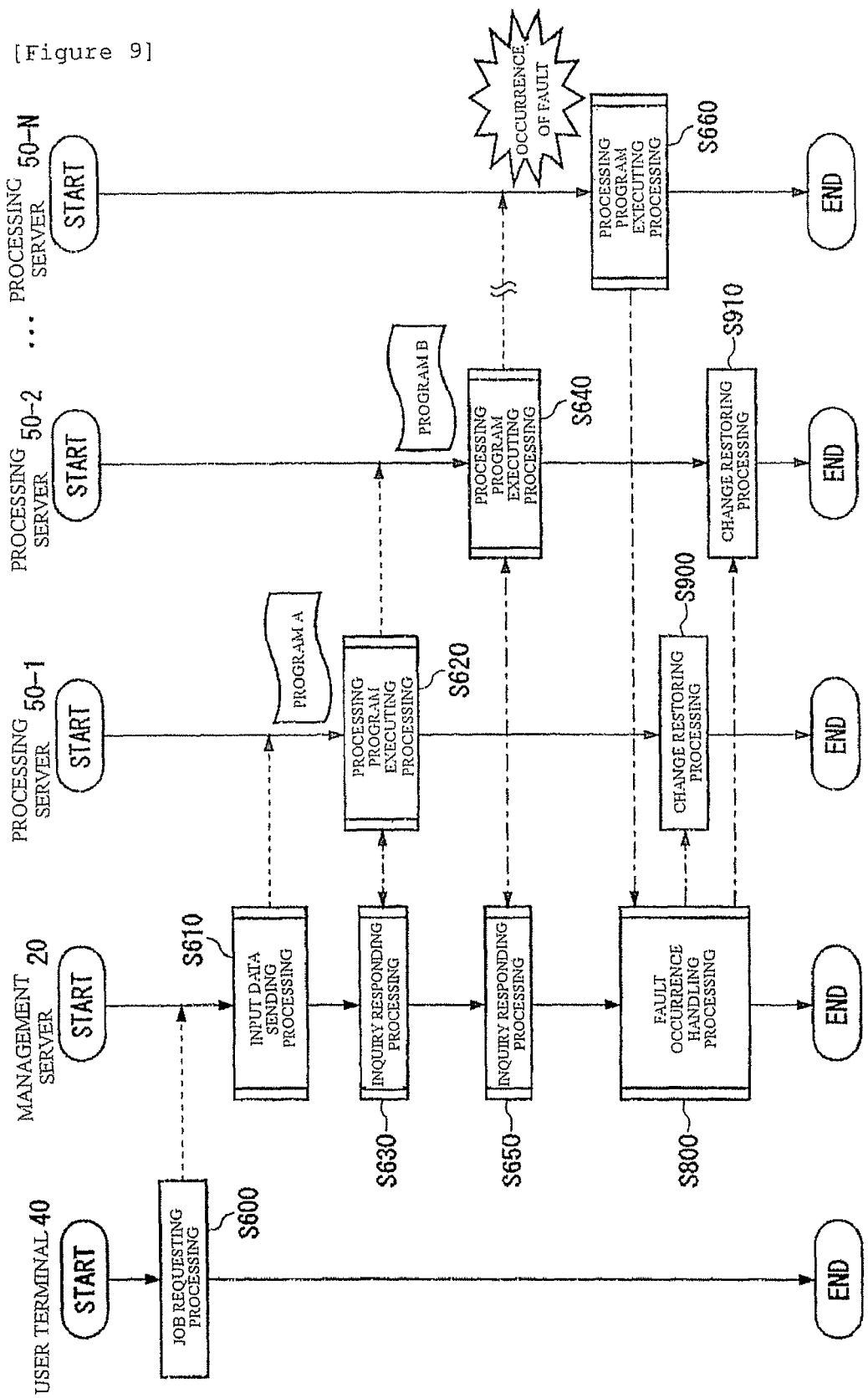
[Figure 9]

[Figure 10]
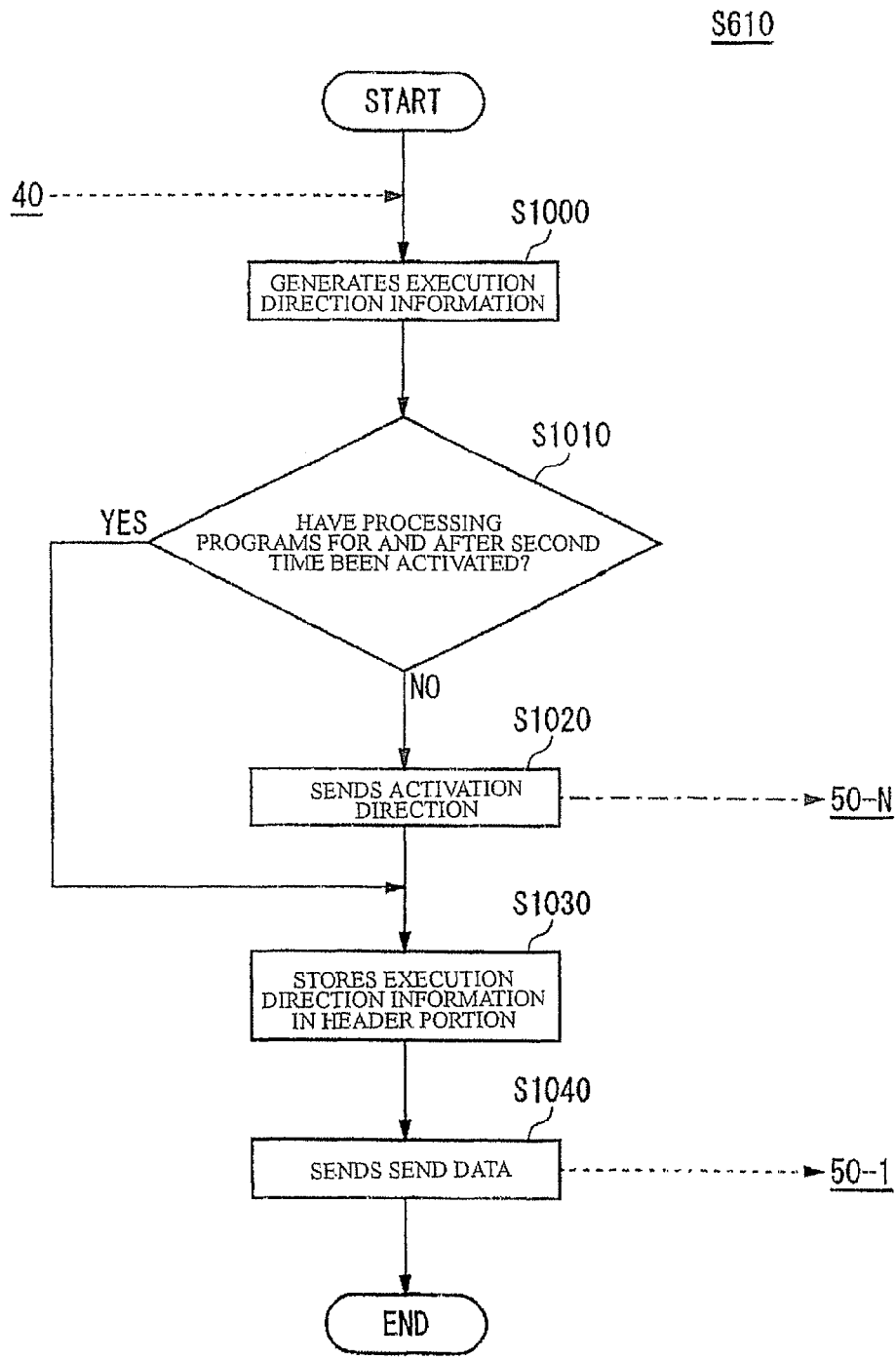

[Figure 11]
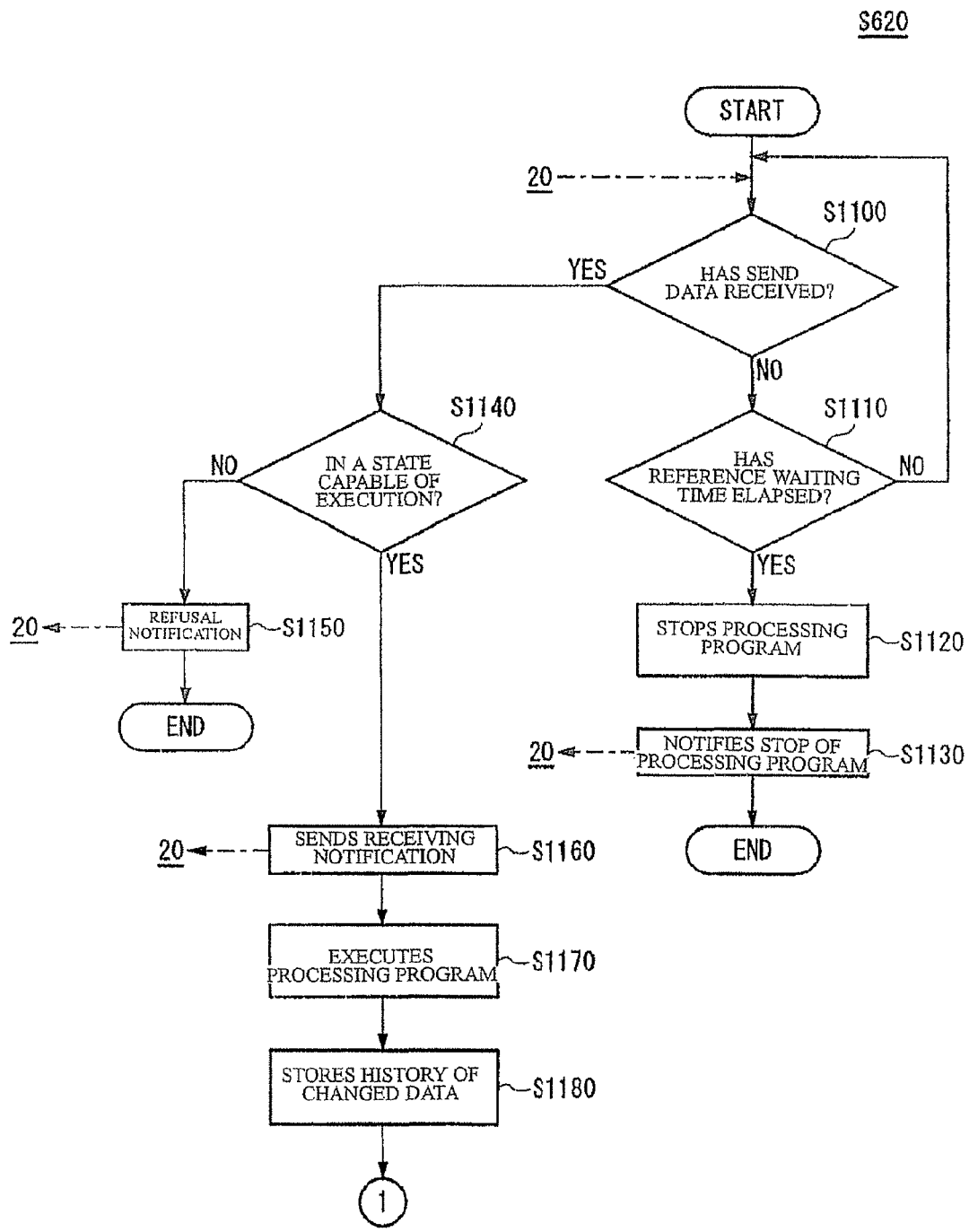

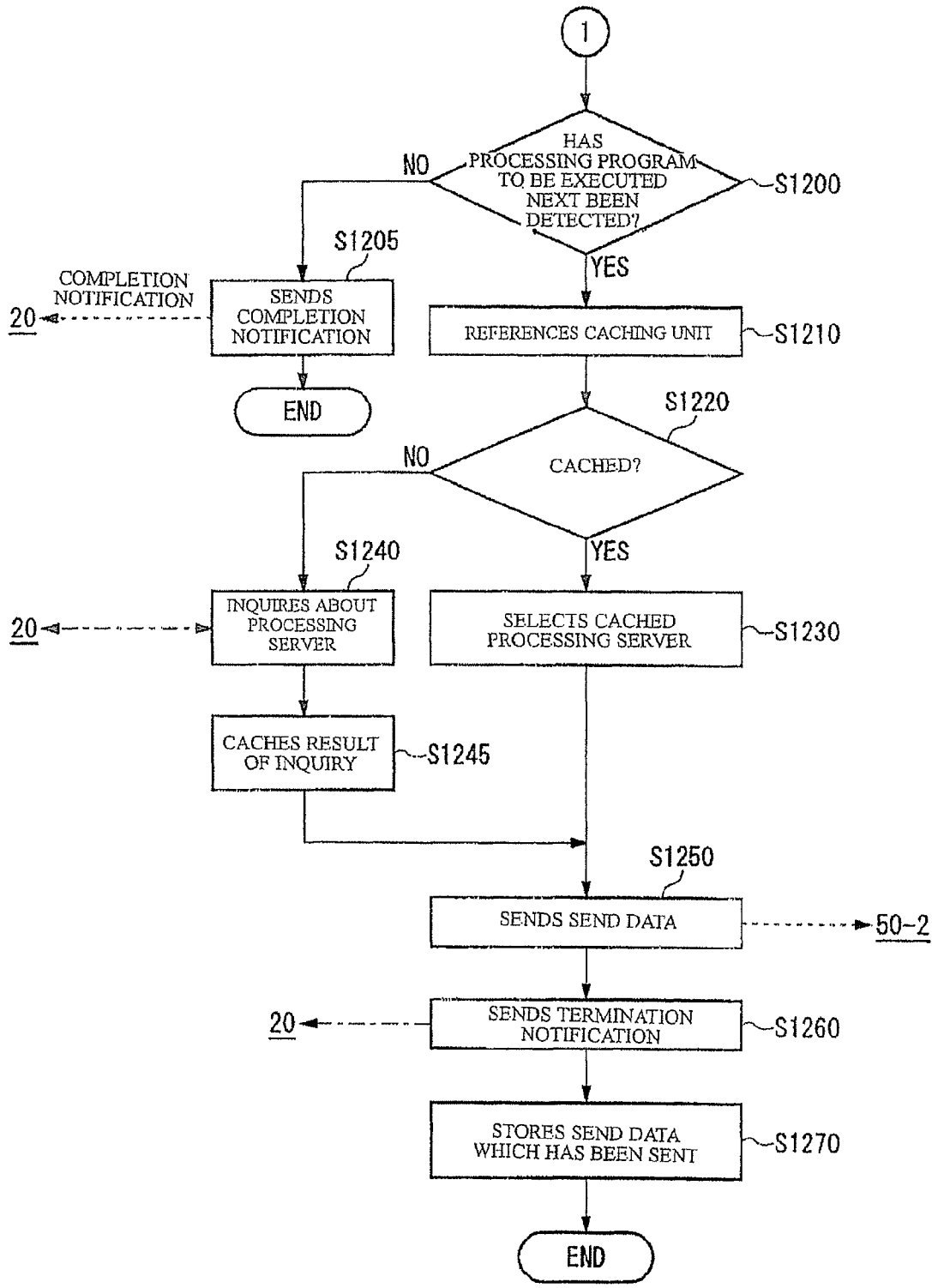
[Figure 12]

[Figure 13]
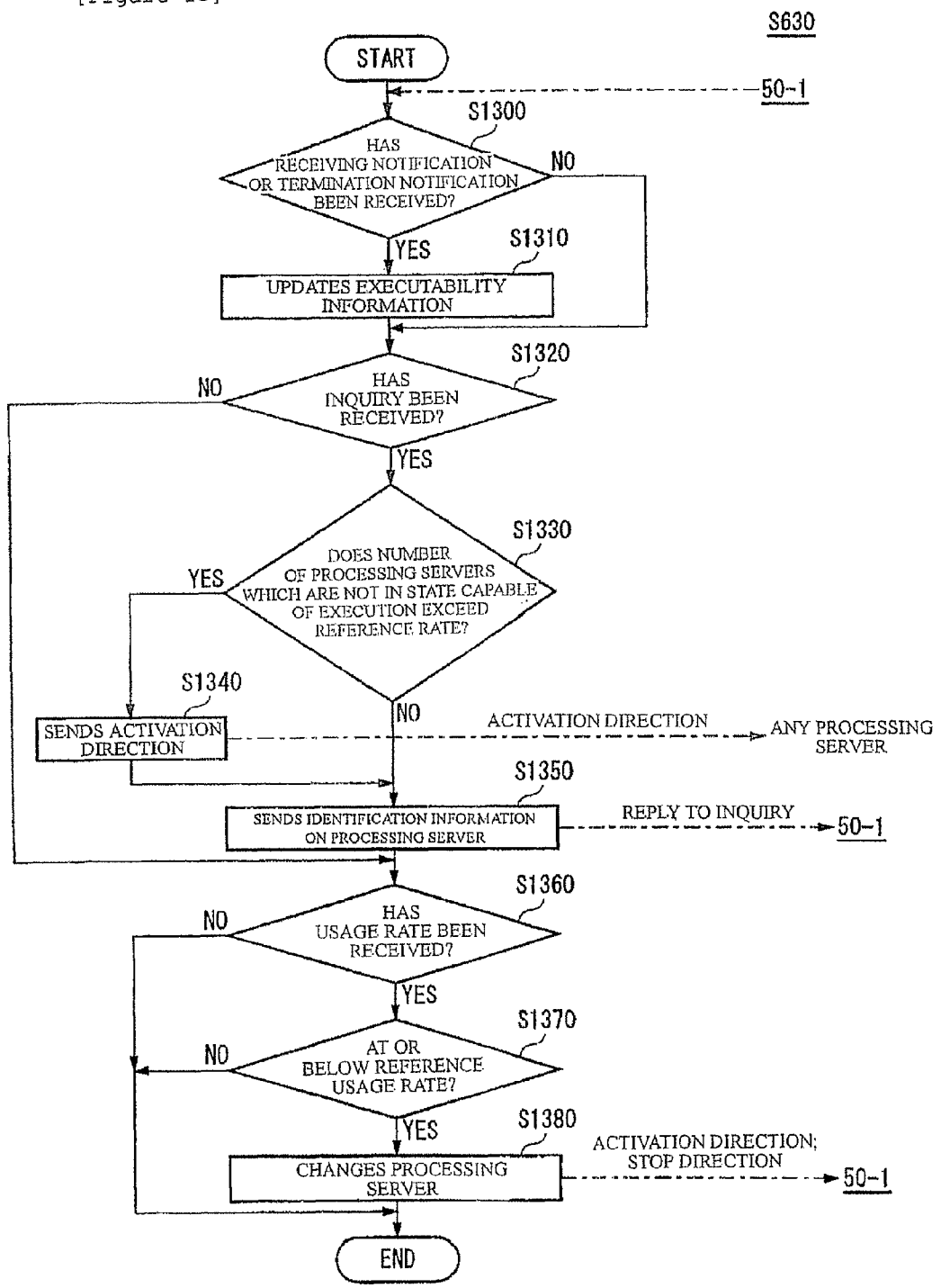

[Figure 14]
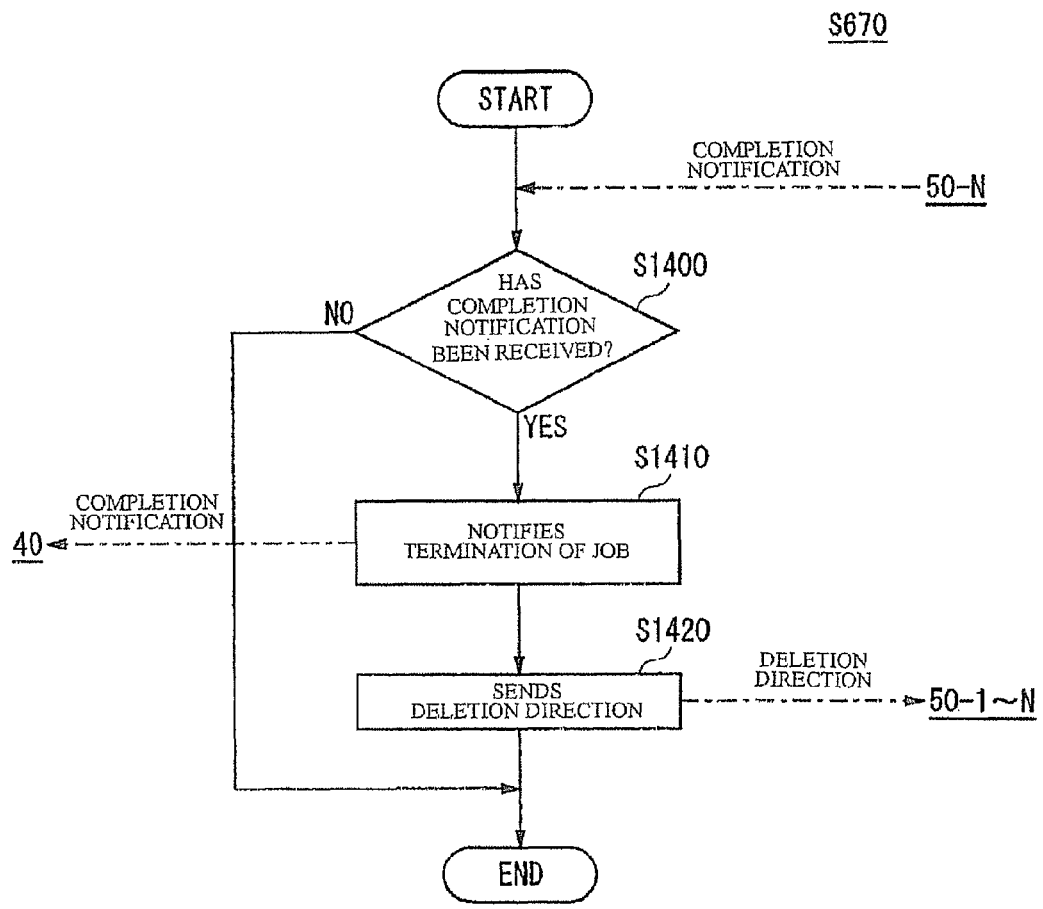

[Figure 15]
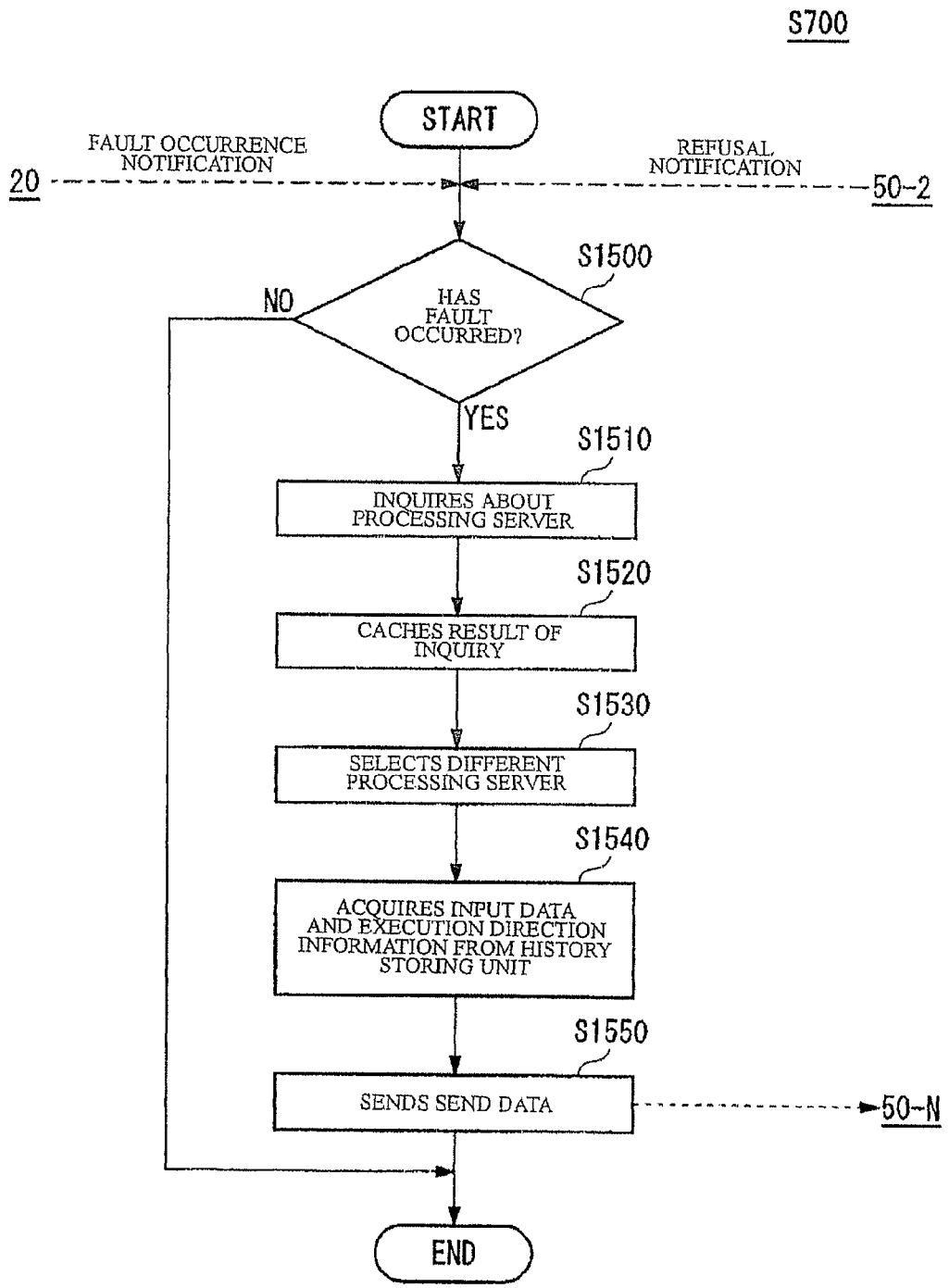

[Figure 16]
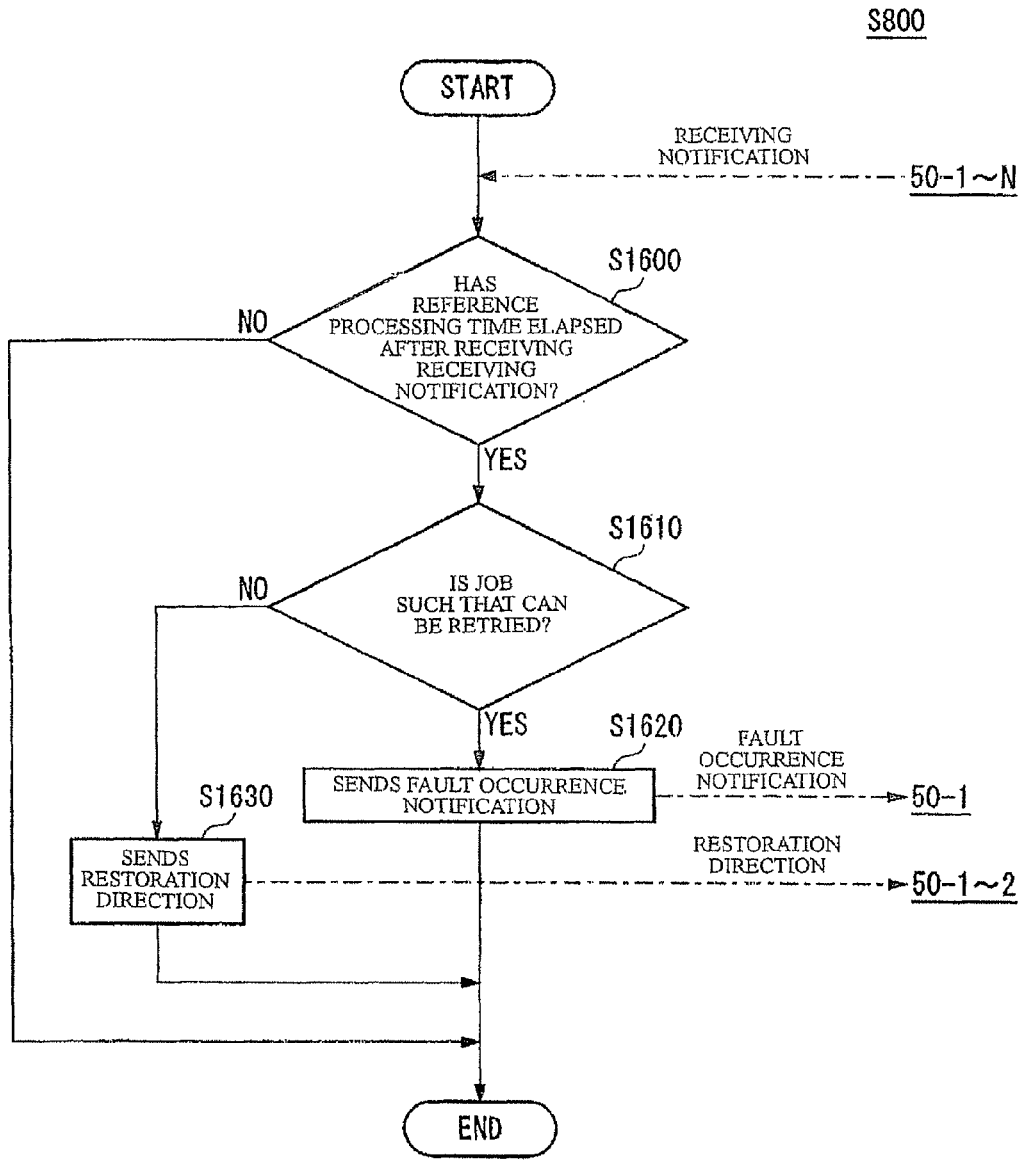

[Figure 17]
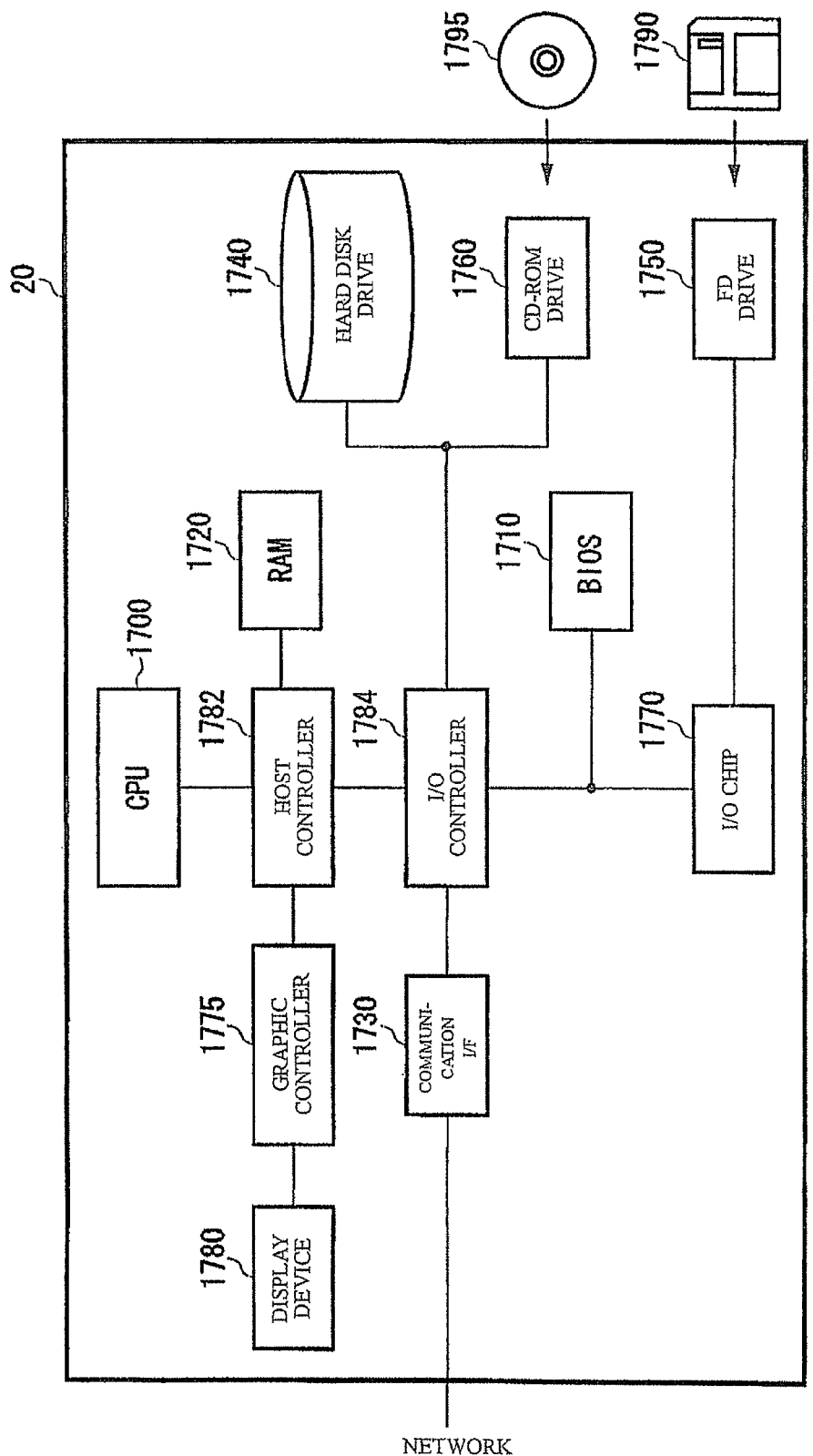

GRID COMPUTING SYSTEM, MANAGEMENT SERVER, PROCESSING SERVER, CONTROL METHOD, CONTROL PROGRAM AND RECORDING MEDIUM

FIELD OF THE INVENTION

The present invention relates to a grid computer system, a management server, a processing server, a control method, a control program and a recording medium. In particular, the present invention relates to a grid computing system in which multiple processing servers managed by a management server cooperate with one another to process a requested job, a management server, a processing server, a control method, a control program and a recording medium.

BACKGROUND OF THE INVENTION

Recently, attention has been attracted to grid computing in which each of multiple computers connected with one another via a network processes one of multiple processing portions included in a job to efficiently execute the job. In such grid computing, a job requestor sends a pair of a program for processing a part of the job and data required for processing the job to each of the multiple computers. Each of the multiple computers executes the received program with the received data as input and returns the execution result to the requester. The job requester integrates respective returned execution results to obtain a result of the job. Accordingly, even when a huge amount of data is required for a job, it is possible to efficiently complete the job by causing the multiple computers to execute respective parts of the job in parallel.

An example of a grid computing system is described in a non-patent document 1.

[Non-patent document 1] "Information Processing" issued by Information Processing Society of Japan on 2003, Vol. 44, featuring in "The Present and Prospect of PC Grid"

In the grid computing described above, however, only a job requestor's server sends a program and data to each of the multiple computers. Therefore, as the number of computers to be requested increases, load on the requestor's server also increases, and network traffic is concentrated on the requestor's server. Accordingly, in order to efficiently complete a job by a lot of computers, it is required to strengthen server equipment at great cost.

SUMMARY OF THE INVENTION

The object of the present invention is to provide a grid computing system capable of solving the above problem, a management server, a processing server, a control method, a control program and a recording medium. The object can be achieved by combination of the characteristic described in the independent claims in the claims. The dependent claims provide further advantageous, specific examples of the present invention.

BRIEF DESCRIPTION OF THE DRAWINGS

FIG. 1 is a functional block diagram of a grid computing system 10;
FIG. 2 is a functional block diagram of a management server 20;
FIG. 3 shows an example of the data structure of send data 30;
FIG. 4 shows an example of the data structure of a processing server information storing unit 220;
FIG. 5 is a functional block diagram of a processing server 50-2;
FIG. 6 shows an outline of the operational flow of the grid computing system 10 when it normally operates (first example);
FIG. 7 shows an outline of the operational flow of the grid computing system 10 when a fault has occurred (second example);
FIG. 8 shows an outline of the operational flow of the grid computing system 10 when a fault has occurred (third example);
FIG. 9 shows an outline of the operational flow of the grid computing system 10 when a fault has occurred (fourth example);
FIG. 10 shows details of operation performed at S610;
FIG. 11 shows details of operation performed at S620;
FIG. 12 shows details of operation to be continued from FIG. 11;
FIG. 13 shows details of operation performed at 5630;
FIG. 14 shows details of operation performed at 5670;
FIG. 15 shows details of operation performed at 5700;
FIG. 16 shows details of operation performed at 5800; and
FIG. 17 shows an example of hardware configuration of a computer which functions as the management server 20.

DETAILED DESCRIPTION OF THE INVENTION

In order to solve the above problem there are provided a system comprising multiple processing servers, each of which executes one or more programs assigned thereto from among multiple programs for processing one or more steps included in a requested job, and a management server for managing the multiple processing servers; the management server comprising: an execution direction generating unit for generating execution direction with identification information of each of the multiple programs and the execution order of the multiple programs; and an input data sending unit for sending, to a processing server for executing a program to be executed first, input data for the job in association with the execution direction; and each of the multiple processing servers comprising: a program executing unit for executing the assigned program with the received input data to update the input data; a processing server selecting unit for selecting a processing server for executing a program to be executed next with the updated input data, based on the execution direction in association with the input data; and an input data transferring unit for sending the updated input data in association with the execution direction, to the processing server selected by the processing server selecting unit. Further, there are provided a processing server and a management server of the grid computing system; a control method for controlling the processing server or the management server; a control program for controlling the processing server or the management server; and a recording medium on which the control program is recorded.

The summary of the invention described above does not enumerate all the necessary characteristics of the present invention, and sub-combinations of these groups of characteristics may also be included in the invention.

According to the present invention, it is possible to construct a grid computing system by combining more computers.

The present invention will be described below through an embodiment of the invention. The embodiment described below does not limit the invention to the claims, and all the combinations of characteristics described in the description of the embodiment are not necessarily required for solution means of the invention.

FIG. 1 is a functional block diagram of a grid computing system 10. The grid computing system 10 comprises a management server 20, a user terminal 40, and processing servers 50-1 to 50-N, which are connected to one another via a network such as LAN, WAN and the Internet. The user terminal 40 is a terminal such as a personal computer, for example, and may be realized in the same configuration as that of a job requestor's terminal in an existing grid computing system. On each of the processing servers 50-1 to 50-N, there is installed and activated in advance a program assigned thereto from among multiple programs to process multiple processing portions included in a job. On each of databases 55-1 to 50-N, the same data, for example, is stored in advance.

Receiving a direction from a user, the user terminal 40 requests a job from the management server 20. The management server 20 sends a pair of input data to be inputted in the job and execution direction indicating the execution order of the multiple programs and the like, to the processing server 50-1 as send data 30. The processing server 50-1 executes a program with the input data received from the management server 20 as input, based on the received execution direction, to update the input data. The processing server 50-1 sends a pair of the updated input data and the execution direction to the processing server 50-2 as send data 30.

In this case, the processing server 50-1 may inquire of the management server 20 about a sending destination to which the input data is to be sent next by means of control data. The processing server 50-1 may access data stored in the database 55-1 depending on the content of processing. Similarly, the respective processing servers 50-2 to 50-(N−1) sequentially execute programs with the input data as input. Finally, the processing server 50-N sends a completion notification indicating that execution of all the programs has been completed, to the management server 20. The management server 20 transfers the received completion notification to the user terminal 40.

As described above, in the grid computing system 10 according to this embodiment, each processing server does not send a program but sends only data required for processing. As a result, even if a lot of jobs are inputted from a lot of user terminals 40, it is possible to efficiently execute the jobs by executing each of portions of each job in a pipeline method.

FIG. 2 is a functional block diagram of the management server 20. The management server 20 has an execution direction generating unit 200, an input data sending unit 210, a processing server information storing unit 220, an inquiry responding unit 230, a program activating unit 240, a fault occurrence notification sending unit 250, a processing server changing unit 260 and a deletion directing unit 270. Receiving a request for a job from a user terminal 40, the execution direction generating unit 200 generates identification information identifying each of multiple programs for processing multiple processing portions included in the job and execution direction including the execution order of the multiple programs. The execution direction generating unit 200 then sends the generated execution direction to the input data sending unit 210 together with input data to be inputted into the job.

The input data sending unit 210 sends the input data and the execution direction in association with each other, to a processing server for executing a program to be executed first with the input data as input, for example, the processing server 50-1. In this case, the input data sending unit 210 may select the processing server for executing a program to be executed first based on data stored in the processing server information storing unit 220.

The processing server information storing unit 220 stores identification information identifying each of multiple programs and identification information on a processing server for executing the program in association with each other. Furthermore, the processing server information storing unit 220 stores, in association with the identification information on each processing server, executability information indicating whether or not the processing server is in a state capable of newly receiving input data and executing a program. The processing server information storing unit 220 may further store, in association with the identification information on each processing server, the time when the processing server has received input data or the maximum throughput and the usage rate of computation resources of the processing server.

When receiving an inquiry about a processing server for executing a predetermined program from any of the processing servers 50-1 to 50-N, the inquiry responding unit 230 acquires the identification information on a processing server which corresponds to the identification information on the program for which the inquiry has been made, from the processing server information storing unit 220, and sends it as a reply to the inquiry. If a predetermined condition is satisfied, the program activating unit 240 detects each of programs to be executed for and after the second time with input data as input, based on the execution direction generated by the execution direction generating unit 200, and activates each of the detected programs on any of processing servers different from the processing server which is a sending destination of the input data sending unit 210.

Specifically, the program activating unit 240 may execute a program when the condition is satisfied that the number of processing servers for executing the programs to be executed for and after the second time is below a predetermined reference number, or the condition is satisfied that such a processing server is not detected at all. If processing servers more than a predetermined reference rate, among one or multiple processing servers for executing the program about which the inquiry responding unit 230 has received an inquiry, are not in a state capable of executing the program, the program activating unit 240 may activate the program on any of processing servers which have not activated the program yet.

Accordingly, the next program can be prepared in advance, and it is possible to minimize the possibility of suspension of the job. The program activating unit 240 may update the data in the processing server information storing unit 220 as these processes proceed. The fault occurrence notification sending unit 250 determines whether or not, after having received a receiving notification from any processing server, it has received a termination notification from the processing server within a predetermined reference processing time, based on the information stored in the processing server information storing unit 220. If the fault occurrence notification sending unit 250 cannot receive the termination notification within the predetermined reference processing time, it sends, to a sending-source processing server which sent input data and the like to the processing server, a fault occurrence notification indicating that a fault has occurred in execution of a program on the processing server.

The processing server changing unit 260 determines whether or not the usage rate of computation resources used by any of the multiple processing servers executing a program is below a predetermined reference usage rate, based on the data stored in the processing server information storing unit 220. If the usage rate of computation resources used by any processing server is below the reference usage rate, the processing server changing unit 260 sets the processing servers 50-1 to 50-N so that a different server with the maximum throughput less than that of the processing server executes the program. With this, the processing server changing unit 260 updates the data in the processing server information storing unit 220.

If receiving a completion notification from the processing server 50-N which has executed a program last, the deletion directing unit 270 determines that the job has been completed by execution of all the multiple programs. In this case, the deletion directing unit 270 causes the input data and the execution direction stored during the process of executing the job to be deleted from each of the multiple processing servers. Alternatively, the deletion directing unit 270 may only notify that the input data and the execution direction is unnecessary. In this case, the processing servers having received this notification may periodically detect and delete the unnecessary input data and execution direction.

FIG. 3 shows an example of a data structure of the send data 30. FIG. 3(*a*) shows the outline of the data structure of the send data 30. The send data 30 includes a body portion and a header portion. The send data 30 includes input data in the body portion and execution direction 300 in the header portion. The input data sending unit 210 may send the input data and the execution direction 300 in association with each other by storing the execution direction 300 in the header portion of the input data as described above.

In addition, the send data 30 preferably includes a processed flag indicating a program which has been already executed among program shown by the execution direction 300. Accordingly, the processing server 50-1 and the like, which has received send data 30, can appropriately determine which program should be executed next even when multiple programs are executable. Furthermore, in the send data 30, there may be stored information indicating termination condition of each program, for example, information indicating normal termination or abnormal termination, or information indicating an error code, in addition to the processed flag. Thereby, it is possible to facilitate, in case of any fault, troubleshooting the cause of the fault.

Instead, the send data 30 may have only identification information on programs which have not been executed yet without having identification information on programs which have already been executed. That is, the processing server 50-1 and the like may delete the identification information on programs which have already been executed from the send data 30. Thereby, the data size of send data 30 can be decreased.

FIG. 3(*b*) shows an example of the execution direction 300. The execution direction 300 includes JOB, information identifying a job, in the first line. As the first step, the execution direction 300 includes a direction to execute a program the identification information of which is "program A", in the second line. Furthermore, the execution direction 300 includes information indicating files to be used for execution of the program A in the third and fourth lines. These files are stored in the databases 55-1 to 55-N, for example.

The execution direction 300 includes a direction to execute a program the identification of which is "program B" in the fifth line as the second step. Similarly to the first step, the execution direction 300 includes information indicating files to be used for execution of the program B in the sixth and seventh lines. The execution direction 300 may be described in a form such as a work flow script and JCL (Job Control Language).

In this case, a program is, for example, a program handled by an operating system of a computer as an executable file. Instead, the program may be combination of an executable file and a library filed to be dynamically read when the program is executed. Furthermore, the program may be a process or a thread activated by a predetermined program being executed, or at least one function, procedure, method or step described in a predetermined program.

As described above, the execution direction 300 includes identification information on each program, for example, the program A and the program B, and the execution order of these programs. Thereby, a processing server which has received send data 30 can not only appropriately select a program to be executed but also appropriately select a program to be executed next.

The execution direction 300 may include various information required for completion of a job, in addition to the data shown in the figure. For example, the execution direction 300 may further include identification information on a database to be referred to by each program, or may further include information indicating a destination to which a notification that at all the programs have been executed is sent when they are executed.

FIG. 4 shows an example of the data structure of the processing server information storing unit 220. The processing server information storing unit 220 stores a processing server ID, indication in formation on each processing server, and identification information (ID) on a program to be installed and executed on the processing server in association with each other. Furthermore, the processing server information storing unit 220 stores, in association with a processing server ID, the number of processings indicating the number of input data being processed on the processing server and the time when the processing server received a receiving notification, which indicates receiving of input data, from a different processing server last.

In this case, the number of input data being processed on a processing server includes not only the number of input data treated as input by the program being actually executed on the processing server but also the number of input data which have been received by the processing server but unprocessed and are waiting for being processed. The time when a receiving notification was received last means the time of receiving of a receiving notification in the case where the receiving notification was received but a termination notification corresponding to the receiving notification has not been received yet. Accordingly, the fault occurrence notification sending unit 250 can measure the time which has elapsed without receiving a termination notification after receiving a receiving notification from each processing server.

Furthermore, the processing server information storing unit 220 stores, in association with each processing server ID, executability information indicating whether or not the processing server is in a state capable of newly receiving input data and executing a program. In this case, the processing server information storing unit 220 may determine, based on the number of input data waiting for being processed which each processing server allows and input data being processed on the processing server, whether or not each processing server is in a state capable of execution to store the executability information. For example, if the number of input data waiting for being processed which a processing server (for example, NodeBB) allows is one (1), and the number of input data being processed on the processing server is two (2), then the processing server information storing unit 220 determines that the processing server is not in a state capable of execution and stores executability information to that effect.

The processing server information storing unit 220 may further store, in association with each processing server ID, the maximum throughput and the usage rate of computation resources of the processing server in association with each other. The maximum throughput of a processing server may be the operating frequency of the CPU of the processing server, the kind of the CPU, or the number of instructions which can be processed by the CPU per unit time. In addition, the maximum throughput may be the access speed or capacity of the hard disk drive of the processing server or a value determined by the access speed or capacity of the memory of the processing server.

The usage rate of computation resources by a processing server is, for example, the ratio of the time during which the CPU of the processing server is executing a program within a predetermined reference time to the reference time. Instead, the usage rate may be the memory or hard disk occupancy rate.

FIG. 5 is a functional block diagram of the processing server 50-2. The processing server 50-2 has a program executing unit 500, a processing server selecting unit 510, a caching unit 520, an input data transferring unit 530, a history storing unit 540, a fault occurrence determining unit 550 and a change restoring unit 560. With reference to this figure, in order to describe a process by a processing server of updating input data received from a different processing server and transferring it to another different processing server, the processing server 50-2 will be described. The processing server 50-1 and each of the processing servers 50-3 to 50-N have almost the same configuration as that of the processing server 50-2 shown in this figure, and therefore description thereof will be not provided.

If the program executing unit 500 receives input data from the processing server 50-1 when it is in a state capable of execution, it acquires an assigned program from the database 55-2, for example, and executes the program with the received input data as input. The program executing unit 500 then updates the input data by execution of the program, and sends the updated input data to the input data transferring unit 530. The program executing unit 500 may refer to data of the database 55-2 or update the data of the database 55-2 by execution of the program.

Each of the databases 55-1 to 55-N may store different, or they may be clone databases which store the same data. In this case, the program executing unit 500 may reflect update of data of the database 55-2 on the other databases, for example, the databases 55-1 and databases 55-3 to 55-N by means of an existing system for keeping consistency of databases. Thereby, it is unnecessary to send all the data of the database as input data, and only updated part of the data is sent efficiently.

On the contrary, if the program executing unit 500 receives input data from the processing server 50-1 when it is not in a state capable of execution, it determines that it cannot newly receive the input data. The program executing unit 500 sends a refusal notification of refusing the input data, to the processing server 50-1 which is the sending source of the input data and the execution direction. If the program executing unit 500 does not receive input data and execution direction within a predetermined reference waiting time after receiving input data last, it stops execution of a program on the processing server 50-2 and notifies the management server 20 to that effect. Furthermore, if the program executing unit 500 is directed to stop execution of a program by the management server 20, it also stops execution of the program.

The processing server selecting unit 510 receives execution direction in association with input data, from the processing server 50-1. The processing server selecting unit 510 then selects a processing server for executing a program to be executed next with the input data updated by the program executing unit 500 as input, based on the received execution direction. For example, the processing server selecting unit 510 inquires of the management server 20 about identification information on a processing server for executing a program to be executed next with the updated input data as input, and selects a processing server identified by the identification information obtained as a result of the inquiry. More specifically, the caching unit 520 has identification information on processing servers obtained by the processing server selecting unit 510 as a result of inquiring of the inquiry responding unit 230 in the past, cached in association with identification information on programs to be executed by the processing servers.

If identification information on a processing server for executing the program is not cached by the caching unit 520, the processing server selecting unit 510 inquires of the inquiry responding unit 230 of the management server 20 about the processing server for executing the program. On the contrary, if identification information on the processing server for executing the program is cached by the caching unit 520, the processing server selecting unit 510 selects the processing server the identification information of which is cached. If it is determined by the fault occurrence determining unit 550 that a fault has occurred, the processing server selecting unit 510 reselects a different processing server for executing the program to be executed next with the updated input data as input. With reference to this figure, description will be made on a case where the processing server selecting unit 510 has selected the processing server 50-(N−1).

Then, the input data transferring unit 530 sends the received execution direction and the updated input data in association with each other, to the processing server 50-(N−1) selected by the processing server selecting unit 510. The input data transferring unit 530 stores then the sent input data and execution direction in the history storing unit 540. If receiving a refusal notification from the processing server 50-(N−1), the input data transferring unit 530 sends information to the effect to the fault occurrence determining unit 550. In this case, the input data transferring unit 530 acquires the input data and the execution direction from the history storing unit 540 and sends them to the different processing server selected by the processing server selecting unit 510.

As described above, the history storing unit 540 stores the history of input data and execution direction sent by the input data transferring unit 530 to a processing server. Furthermore, the history storing unit 540 stores history information on data on the processing server 50-2, which has been changed by the program executing unit 500 through execution of a program, in association with information which enables restoration to the state before the change. In this case, the data on the processing server 50-2 means, for example, data stored in the database 55-2. Furthermore, the data on the processing server 50-2 includes not only data managed by the processing server 50-2 but also data in a storage device shared with a different server device via a network file system or a shared file system.

If receiving a fault occurrence notification from the management server 20, the fault occurrence determining unit 550 determines that a fault has occurred in execution of a program on a sending-destination processing server to which the input data transferring unit 530 has sent the updated input data and the execution direction. For another example, if the fault occurrence determining unit 550 is notified by the input data transferring unit 530 that the input data transferring unit 530 has received a refusal notification from the processing server 50-(N−1), the fault occurrence determining unit 550 determines that a fault has occurred in execution of a program on the processing server 50-(N−1). If the job in which the fault has occurred is such that can be retried by avoiding the fault, then the fault occurrence determining unit 550 notifies the processing server selecting unit 510 that a different processing server is to be selected. If the job is not such, the fault occurrence determining unit 550 notifies the change restoring unit 560 of a restoration direction indicating that data changed by the program executing unit 500 should be restored to the original state.

In response to the notification from the fault occurrence determining unit 550, the change restoring unit 560 restores the data changed by the program executing unit 500, for example, the data in the database 55-2 based on the history information in the history storing unit 540.

As described above and shown in this figure, the processing server 50-2 executes a program installed and activated in advance as received input data as input, selects a processing server for executing a program to be executed next, and sends input data to the processing server. Thereby, it is possible to reduce the load of sending and receiving a program and input data to be imposed on the management server 20.

With the use of FIGS. 6 to 9, description will be made on four examples in which the management server 20 causes each of the processing servers 50-1 to 50-N to execute a program in the grid computing system 10 of this embodiment. In FIGS. 6 to 9, movement of input data and execution direction, or a completion notification is indicated by a dashed line, and movement of other control data is indicated by a dotted and dashed line.

FIG. 6 shows an outline of the operational flow of the grid computing system 10 when it normally operates (first example). The user terminal 40 requests a job from the management server 20 (S600). Then, the management server 20 stores execution direction in the header portion of input data and sends the input data to the processing server 50-1 (S610). The management server 20 may detect each of programs to be executed for and after the second time with input data as input and execute the detected program on a processing server different from the processing server 50-1, for example, the processing server 50-N.

When receiving input data, the processing server 50-1 sends a receiving notification to the management server 20 (S620). The processing server 50-1 executes a program (for example, a program A) with the received input data as input to update the input data. When execution of the program ends, the processing server 50-1 sends a termination notification to the management server 20.

The processing server 50-1 then selects a processing server for executing a program to be executed next by inquiring of the management server 20 about it as necessary. The processing server 50-1 sends the input data and the execution direction to the selected processing server 50-2. If receiving an inquiry from the processing server 50-1, the management server 20 returns identification information on a processing server which corresponds to the identification information on the program for which the inquiry has been made, to the processing server 50-1 (S630).

When receiving the input data, the processing server 50-2 sends a receiving notification to the management server 20 (S640). The processing server 50-2 then executes a program (for example, a program B) with the received input data as input to update the input data. When execution of the program ends, the processing server 50-2 sends a termination notification to the management server 20.

The processing server 50-2 then selects a processing server for executing a program to be executed next by inquiring of the management server 20 about it as necessary. The processing server 50-2 sends the input data and the execution direction to the selected processing server. If receiving an inquiry from the processing server 50-2, the management server 20 returns identification information on a processing server which corresponds to the identification information on the program for which the inquiry has been made, to the processing server 50-2 (S650).

Description will be now made on a case where the input data and the execution direction sent by the processing server 50-2 have reached the processing server 50-N via multiple processing servers sequentially.

The processing server 50-N executes a program (for example, a program X) with the received input data as input to update the input data (S660). The processing server 50-N returns a completion notification indicating that execution of all the programs for executing the job has been completed, to the management server 20.

The management server 20 transfers the received completion notification to the user terminal 40 (S670). The management server 20 then sends, to each of the processing servers 50-1 to 50-N, a deletion direction to delete the input data and the execution direction from the history storing unit of the processing server.

In addition to receiving/sending of data shown in this figure, each of the processing servers 50-1 to 50-N may periodically send information indicating the usage rate, the rate of computation resources used by execution of a program, to the management server 20.

FIG. 7 shows an outline of the operational flow of the grid computing system 10 when a fault has occurred (second example). The processings performed at steps S600, S610, S620 and S630 in this figure are almost the same as those performed at the steps with the same reference numerals in FIG. 6, and therefore, description thereof will not be provided here. At S640, if the processing server 50-2 is not in a state capable of execution or if any fault has occurred in execution of a program, it sends a refusal notification indicating refusal of input data, to the processing server 50-1 (S640).

The processing server 50-1 reselects a different processing server for executing a program to be executed next with input data as input (S700). For example, the processing server 50-1 selects the processing server 50-N. The processing server 50-1 acquires the input data and the execution direction from the history storing unit and resends them to the processing server 50-N. In response to this, the processing server 50-N executes a program with the received input data as input to update the input data (S660). The processing server 50-N selects a processing server for executing a program to be executed next by inquiring of the management server 20 about it as necessary. The processing performed at S710 is almost the same as that performed at S630, and therefore, description thereof will not be provided here.

FIG. 8 shows an outline of the operational flow of the grid computing system 10 when a fault has occurred (third example). The processings performed at S600, S610, S620, S630, S660 and S700 in this figure are almost the same as the processings with the same reference numerals in FIG. 7, and therefore, description thereof will not be provided. With reference to this figure, description will be made on a case where a fault occurs in execution of a program at S640, and the processing server 50-2 cannot send a refusal notification to the processing server 50-1, unlike the case in FIG. 7.

If the management server 20 cannot receive a termination notification from the processing server 50-2 within a reference processing time after receiving a receiving notification from the processing server 50-2 last, it determines that a fault has occurred in execution of a program on the processing server 50-2 (S800). The management server 20 then sends a fault occurrence notification to the effect to the sending source which has sent input data to the processing server 50-2, that is, the processing server 50-1.

The processing server 50-1 reselects a different processing server for executing a program to be executed next with input data as input (S700). For example, the processing server 50-1 selects the processing server 50-N. The processing server 50-1 acquires input data and execution direction from the history storing unit and resends them to the processing server 50-N. The processing performed at S710 is almost the same as that performed at S630, and therefore description thereof will not be provided.

FIG. 9 shows an outline of the operational flow of the grid computing system 10 when a fault has occurred (fourth example). The processings performed at S600, S610, S620, S630, S640 and S650 in this figure are almost the same as those performed at the steps with the same reference numerals in FIG. 6, and therefore, description thereof will not be provided here. The figure illustrates a case where a fault has occurred in execution of a program at S660.

If the management server 20 cannot receive a termination notification from the processing server 50-N within a reference processing time after receiving a receiving notification from the processing server 50-N last, it determines that a fault has occurred in execution of a program on the processing server 50-N (S800). If the job being executed is such that cannot be retried by avoiding the fault, then the management server 20 sends a restoration direction to restore the change made by execution of a program to the original state, to all the processing servers which have executed the programs for the job before the processing server 50-N.

Receiving this restoration direction, the change restoring unit 560 of the processing server 50-1 determines that a fault has occurred on any of the sending-destination processing servers to which the input data transferring unit 530 have sent updated input data and the like, for example, any of the processing server 50-2 to 50-N. The change restoring unit 560 then restores the data changed by the program executing unit 500 to the original state based on the history information of the history storing unit 540 (S900).

Similarly, upon receiving this restoration direction, the change restoring unit 560 of the processing server 50-2 restores the data changed by the program executing unit 500 to the original state based on the history information of the history storing unit 540 (S910). Thereby, it is possible to change a part of the data to be changed and prevent the consistency of the data of the database 55-1 or the database 55-2 from being lost.

Description will be now made using FIGS. 10 to 16 on details of processings performed by the management server 20 and the processing servers 50-1 to 50-N which have been described with reference to FIGS. 6 to 9. Similarly to FIGS. 6 to 9, movement of input data and execution direction, or a completion notification is indicated by a dashed line, and movement of other control data is indicated by dotted and dashed lines.

FIG. 10 shows details of the operation performed at S610. The management server 20 performs the following processings every time it receives a request for a job from the user terminal 40. First, the execution direction generating unit 200 generates execution direction (S1000). The program activating unit 240 then detects programs for and after the second time with input data as input based on the execution direction, and determines whether or not each of such program has already been activated on any of processing servers (S1010).

If no processing server has been activated for a program (S1010: NO), then the program activating unit 240 sends a direction to activate the program, for example, to the processing server 50-N (S1020). In this case, the program activating unit 240 stores identification information on a processing server for newly activating a program in the processing server information storing unit 220 in association with the identification information on the program.

Instead, the program activating unit 240 may determine whether to newly activate a program based on information on jobs executed in the past, through the following processings. Specifically, every time the program activating unit 240 causes the program executing unit 500 of each processing server to execute a program, it also causes the program executing unit 500 to notify the throughput required for the execution of the program. Based on such notification, the program activating unit 240 manages the kind of each job requested in the past and the throughputs required for execution of multiple programs for performing multiple processing portions included in the job of the kind in association with each other.

When the program activating unit 240 receives a request for a job, if the throughput required for execution of each program when a job of same kind was executed in the past exceeds the maximum throughput to be processed by a processing server which is already activating the program, the program activating unit 240 newly activates a program on a different processing server. Thereby, it is possible to activate a program in advance for which throughput might be insufficient to smoothly complete a job. For another example, the program activating unit 240 may determine, based on the content of the processing of a job, whether or not the throughput required for execution of each program exceeds the maximum throughput to be processed by a processing server which is already activating the program. Specifically, the program activating unit 240 may make determination based on the throughput specified for each program or may analyze the content of execution of a program.

Then, the execution direction generating unit 200 generates send data by storing the generated execution direction in the header portion of input data to be inputted into the job, and sends it, for example, to the processing server 50-1 (S1030).

FIG. 11 shows details of the operation performed at S620. When a program is activated, the processing server 50-1 periodically performs the following processings. First, the program executing unit 500 determines whether or not send data has been received (S1100). If it is not received (S1100: NO), then the program executing unit 500 determines whether or not a reference waiting time has elapsed since send data has been received last (S1110).

If the reference waiting time has elapsed, that is, if the program executing unit 500 cannot receive the next send data after receiving send data last (S1110: YES), then it stops the program (S1120), notifies the management server 20 to the effect that it has stopped the program (S1130), and terminates the processing. On the contrary, if the program executing unit 500 has received send data (S1100: YES), then it determines whether or not the processing server 50-1 is in a state capable of execution (S1140). If the processing server 50-1 is not in a state capable of execution (S1104: NO), then the program executing unit 500 returns a refusal notification to the management server 20 (S1150). In this case, a state capable of execution includes not only a state in which there is more than predetermined amount of input data waiting for being processed but also a state in which the processing server 50-1 has already stopped execution of the program A.

In addition, the program executing unit 500 may return a refusal notification to the management server 20 in accordance with the following processings. Specifically, the program executing unit 500 detects a program which should have been executed with received input data as input, based on received execution direction. If the detected program cannot be executed by a sending-source processing server which has sent input data, then the program executing unit 500 returns a refusal notification. For example, the detected program cannot be executed by a sending-source processing server which has sent input data, the program executing unit 500 may determine that the processing server was not capable of executing the program when it sent the input data.

In addition, the program executing unit 500 may return a refusal notification when it fails in verifying an electronic signature received with input data. Thereby, it is possible to prevent a sending-source processing server from doing a malicious act of spoofing as a valid processing server.

If the processing server is in a state capable of execution, and the detected program can be executed by the sending-source processing server which sent input data, and furthermore the electronic signature is correctly verified (S1140=YES), then the program executing unit 500 sends a receiving notification to the management server 20 (S1160). Then, the program executing unit 500 executes an assigned program with the input data as input to update the input data (S1170). The history storing unit 540 stores history information on data on the processing server 50-1, which has been changed by the program executing unit 500 through execution of a program, in association with information which enables restoration to the state before the change (S1180).

FIG. 12 shows details of the operation to be continued from FIG. 11. The processing server selecting unit 510 detects a program to be executed next with the input data as input, based on the execution direction received from the management server 20 (S1200). If such a program cannot be detected (S1200: NO), then the processing server selecting unit 510 sends a completion notification to the management server 20 (S1205).

On the contrary, if such a program can be detected (S1200: YES), then the processing server selecting unit 510 references the caching unit 520 to determine whether or not identification information on a processing server for executing the program is cached (S1210). If the identification information is cached (S1220: YES), then the processing server selecting unit 510 selects the processing server the identification information of which is cached (S1230).

On the contrary, if the identification information is not cached (S1220: NO), then the processing server selecting unit 510 inquires of the management server 20 about the identification information on a processing server for executing the program, and selects the processing server identified by the identification information obtained as a result of the inquiry (S1240). In this case, the caching unit 520 caches the identification information obtained as a result of the inquiry in association with the identification information on the program for which the inquiry has been made (S1245).

Then, the input data transferring unit 530 sends the received execution direction and the updated input data in association with each other to the processing server selected by the processing server selecting unit 510 as send data (S1250). The input data transferring unit 530 may create an electronic signature for the updated input data and the execution direction and send the created electronic signature in association with the input data and the execution direction.

Then, the program executing unit 500 sends a termination notification to the management server 20 (S1260). In the case where more than a predetermined time is required for execution of a program, the program executing unit 500 may send information indicating processing progress of the program prior to a termination notification. Then, the history storing unit 540 stores history of the input data and the execution direction sent by the input data transferring unit 530 to the processing server (S1270). In addition to the operations shown in the figure, the processing server 50-1 may periodically send information indicating the usage rate of computation resources used for execution of a program by the program executing unit 500, to the management server 20.

The operation performed at S640 is almost the same as that performed at S620 except that the sending source of send data is the processing server 50-1 instead of the management server 20 and that the sending destination is the processing server 50-N instead of the processing server 50-2, and therefore description thereof will not be provided here. Similarly, the operation performed at S660 is almost the same as that performed at S620 except that the sending source of send data is the processing server 50-2 instead of the management server 20, and therefore description thereof will not be provided here.

FIG. 13 shows details of the operation performed at S630. Every time the management server 20 receives any notification or inquiry from any of the processing servers 50-1 to 50-N, it performs the following processings. First, the processing server information storing unit 220 determines whether or not a receiving notification or a termination notification has been received, for example, from the processing server 50-1 (S1300). If it has been received (S1300: YES) then the processing server information storing unit 220 updates the number of jobs being processed on each processing server, based on the receiving notification or the termination notification, and updates executability information based on the result of the update (S1310).

Then, the inquiry responding unit 230 determines whether or not an inquiry about identification information on a processing server for executing a particular program has been received (S1320). If such an inquiry has been received (S1320: YES), then the program activating unit 240 determines, for the program for which the inquiry responding unit 230 has been inquired of, whether or not the number of such processing servers as are not in a state capable of execution among multiple processing servers for executing the program exceeds a predetermined reference rate (S1330).

If the number exceeds the reference rate (S1330: YES), then the program activating unit 240 newly activates the program on any of processing servers which have not activated the program yet (S1340). In this case, the program activating unit 240 stores the identification information on the processing server on which the program has been newly activated, in the processing server information storing unit 220 in association with the identification information on the program.

The inquiry responding unit 230 acquires the identification information on a processing server which corresponds to the identification information on the program for which the inquiry has been made, from the processing server information storing unit 220 and sends it as a replay to the inquiry (S1350). If the processing server information storing unit 220 stores multiple pieces of identification information on processing servers corresponding to the identification information on the program, the inquiry responding unit 230 may send all the identification information corresponding to the identification information on the program, or may select and send apart of the identification information based on a predetermined determination criteria.

For example, the inquiry responding unit 230 may select and send identification information on a processing server which communicates with the inquiring processing server with a higher communication speed in preference to identification information on a processing server which communicates with the inquiring processing server with a lower communication speed. If a program is newly activated by the program activating unit 240 at S1340, the inquiry responding unit 230 may send only the identification information on the processing server on which the program has been activated.

Furthermore, if the processing server information storing unit 220 receives the usage rate of communication resources to be used by execution of a program, from any of the processing servers 50-1 to 50-N (S1360: YES), then the processing server changing unit 260 determines whether or not the usage rate is at or below the reference usage rate (S1370). If it is at or below the reference usage rate (S1370: YES), then the processing server changing unit 260 causes the program to be executed by a different processing server with the maximum throughput less than that of the processing server which has sent the usage rate (S1380). Specifically, the processing server changing unit 260 sends a stop direction to stop execution of the program to the processing server executing the program and sends an activation direction to activate the program to the different processing server with the maximum throughput less than that of the processing server.

As a result, the processing server before the change stops execution of the program, by its program executing unit 500, and the processing server after the change activates the program, by its program executing unit 500. In this case, the program activating unit 240 stores the identification information on the processing server which has newly activated the program, in the processing server information storing unit 220 in association with the identification information on the program. Meanwhile, the program activating unit 240 deletes the identification information on the processing server which has stopped execution of the program from the processing server information storing unit 220.

The operation performed at S650 is almost the same as that performed at S630 except that the inquiring processing server is the processing server 50-2 instead of the processing server 50-1, and therefore description thereof will not be provided here.

FIG. 14 shows details of the operation performed at S670. If the deletion directing unit 270 receives a completion notification from the processing server 50-N which has executed a program last (S1400: YES), then it determines that the job has been completed by execution of all the multiple programs and notifies the user terminal 40 to the effect (S1410). Then, the deletion directing unit 270 directs each of the processing servers 50-1 to 50-N to delete the input data, the execution direction and the history information stored during the process of executing the job, from the history storing unit 540 of the processing servers 50-1 to 50-N (S1420).

FIG. 15 shows details of the operation performed at S700. The fault occurrence determining unit 550 determines whether or not any fault has occurred in a sending-destination processing server to which input data has been sent (S1500). For example, if receiving a fault occurrence notification from the management server 20 or receiving a refusal notification from the processing server 50-2, the fault occurrence determining unit 550 determines that a fault has occurred.

If it is determined by the fault occurrence determining unit 550 that a fault has occurred (S1500: YES), then the processing server selecting unit 510 inquires of the management server 20 about identification information on a different processing server for executing the program in which the fault has occurred during execution thereof (S1510). In this case, the caching unit 520 caches the identification information obtained as a result of the inquiry in association with the identification information on the program for which the inquiry has been made (S1520).

The processing server selecting unit 510 selects the processing server identified by the identification information obtained as a result of the inquiry (S1530). For example, the inquiry responding unit 230 returns identification information on a processing server which communicates with the inquiring processing server with a higher communication speed in preference, as the result of the inquiry. As a result, the processing server selecting unit 510 selects a processing server which communicates with the inquiring processing server with a higher communication speed in preference to a processing server with a lower communication speed, from among multiple processing servers executing the program to be executed next with updated input data as input. For example, the processing server selecting unit 510 selects a processing server with the highest communication speed and does not select other processing servers.

The input data transferring unit 530 acquires input data and execution direction which has already been sent, from the history storing unit 540 (S1540). The input data transferring unit 530 sends the acquired input data and execution direction to the reselected processing server, for example, the processing server 50-N as send data (S1550).

FIG. 16 shows details of the operation performed at S800. When causing the processing server 50-1 to 50-N to execute a job, the management server 20 periodically repeats the following processings. First, the processing server information storing unit 220 determines, for each of the processing servers, whether or not a reference processing time has elapsed since after receiving a receiving notification from the processing server (S1600). If the reference processing time has elapsed, that is, if a termination notification cannot be received within the reference processing time (S1600: YES), then the processing server information storing unit 220 determines whether or not the job in which a fault has occurred is such that can be retried (S1610).

If the job is such that can be retried (S1610: YES), then the processing server information storing unit 220 sends a fault occurrence notification to the processing server 50-1 (S1620). Furthermore, if a fault has occurred in hardware of a sending-destination processing server to which input data has been sent, the processing server information storing unit 220 may delete the identification information on the program stored in association with the processing server in which the fault has occurred. On the contrary, if the job is such that cannot be retried (S1610: NO), then the processing server information storing unit 220 sends a direction to restore the change of data made by programs which have already executed a part of the job to the original state, to the processing servers which have already executed the programs. For example, the processing server information storing unit 220 sends the direction to the processing server 50-1 and the processing server 50-2 (S1630).

FIG. 17 shows an example of hardware configuration of a computer which functions as the management server 20. The management server 20 is provided with a CPU peripheral part having a CPU 1700, an RAM 1720, a graphic controller 1775 and a display device 1780 which are mutually connected via a host controller 1782, an input/output part having a communication interface 1730, a hard disk drive 1740 and a CD-ROM drive 1760 which are connected to the host controller 1782 via an input/output controller 1784, and a legacy input/output part having a BIOS 1710, a flexible disk drive 1750 and an input/output chip 1770 which are connected to the input/output controller 1784.

The host controller 1782 connects the RAM 1720 to the CPU 1700 and the graphic controller 1775 which access the RAM 1720 at a high transfer rate. The CPU 1700 operates based on the BIOS 1710 and programs stored in the RAM 1720 to control each unit. The graphic controller 1775 acquires image data which is generated by the CPU 1700 and the like on a frame buffer provided within the RAM 1720 to display it on the display device 1780. Instead, the graphic controller 1775 may include a frame buffer for storing image data generated by the CPU 1700 and the like therein.

The input/output controller 1784 connects the host controller 1782 to the communication interface 1730, the hard disk drive 1740 and the CD-ROM drive 1760 which are relatively high speed input/output devices. The communication interface 1730 communicates with external devices via a network. In the hard disk drive 1740, there are stored programs and data to be used by the management server 20. The CD-ROM drive 1760 reads a program or data from a CD-ROM 1795 and provides it for the input/output chip 1770 via the RAM 1720.

To the input/output controller 1784, relatively low speed input/output devices are connected, such as the BIOS 1710, the flexible disk drive 1750 and the input/output chip 1770. In the BIOS 1710, there are stored a boot program to be executed by the CPU 1700 when the management server 20 is activated and programs dependent on the hardware of the management server 20. The flexible disk drive 1750 reads a program or data from a flexible disk 1790 and provided it for the input/output chip 1770 via the RAM 1720. The input/output chip 1770 connects the flexible disk 1790 or various input/output devices via a parallel port, a serial port, a keyboard port, a mouse port and the like.

The program provided for the management server 20 is stored in a recording medium such as the flexible disk 1790, the CD-ROM 1795 and an IC card and provided by a user. The program is read from the recording medium via the input/output chip 1770 and/or the input/output controller 1784, and installed and executed on the management server 20.

The control program to be installed and executed on the management server 20 includes an execution direction generating module, an input data sending module, a processing server information storing module, an inquiry responding module, a program activating module, a fault occurrence notification sending module, a processing server changing module and a deletion directing module. The operation which each module causes the management server 20 to perform is the same as the operation of each of the corresponding members in the management server 20 described with reference to FIGS. 1 to 16, and therefore description thereof will not be provided here.

Furthermore, the control program to be provided for the management server 20 may be installed and executed on each of the processing servers 50-1 to 50-N via a network. The control program to be installed and executed on each of the processing servers 50-1 to 50-N includes a program executing module, a processing server selecting module, a caching module, an input data transferring module, a history storing module and a fault occurrence determining module. The operation which each module causes each of the processing servers 50-1 to 50-N to perform is the same as the operation of the corresponding members in each of the processing servers 50-1 to 50-N described with reference to FIGS. 1 to 16, and therefore description thereof will not be provided here.

The program or modules described above may be stored in an external storage medium. As the storage medium, an optical recording medium such as a DVD and a PD, a magneto-optic recording medium such as an MD, a semiconductor memory such as a tape medium and an IC card, and the like may be used in addition to the flexible disk 1790 and the CD-ROM 1795. The program may be provided for the management server 20 via a network by using a storage device, such as a hard disk or a RAM, provided in a server system connected to a dedicated communication network or the Internet, as a recording medium.

As described in this embodiment, the management server 20 can cause multiple processing servers to sequentially transfer input data without sending/receiving the input data every time it causes a processing server to execute a program. As a result, the load imposed on the management server 20 is reduced, and network traffic to the server is decreased. Furthermore, sending destinations of input data are cached in the processing server 50, and the processing server 50 inquires of the management server 20 only about sending destinations which are not cached. As a result, the network traffic to the management server 20 is further decreased.

Furthermore, according to this embodiment, even when a fault has occurred in execution of a program, the processing server 50 tries restoration without inquiring of the management server 20 as much as possible. As a result, the network traffic to the management server 20 can be decreased. The management server 20 causes programs which are to be executed, to be installed and activated on processing servers in advance. Thereby, it is only the management server 20 that has to manage processing servers to be permitted to access input data, and the load of such management to be imposed on the processing servers can be reduced. Furthermore, the management server 20 can distribute the load imposed on each processing server in response to an inquiry and the like from the processing server 50.

As described above, according to this embodiment, it is possible to combine more computers and construct an appropriate and flexible grid computing system Though the present invention has been described using an embodiment, the technical scope of the present invention is not limited to the scope described in the embodiment described above. It is apparent to one skilled in the art that various changes or improvements can be made to the embodiment described above. It is apparent from the description of the claims that embodiments for which such changes or improvements have been made are also included in the technical scope of the present invention.

According to the embodiment shown above, a grid computing system, a management server, a processing server a control method, a control program and a recording medium shown in each of the items below are realized.

(Item 1) A grid computing system comprising multiple processing servers, each of which executes a program assigned thereto from among multiple programs for processing multiple processing portions included in a job requested by a user, and a management server for managing the multiple processing servers; the management server comprising: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other; and each of the multiple processing servers comprising: a program executing unit for executing the assigned program with the received input data as input to update the input data; a processing server selecting unit for selecting a processing server for executing a program to be executed next with the updated input data as input, based on the execution direction received in association with the input data; and an input data transferring unit for sending the received execution direction and the updated input data in association with each other, to the processing server selected by the processing server selecting unit.

(Item 2) The grid computing system according to item 1, wherein the processing server selecting unit inquires of the management server about identification information on a processing server for executing a program to be executed next with the updated input data as input, and selects a processing server identified by identification information obtained as a result of the inquiry; and the management server further comprises: a processing server information storing unit for storing identification information identifying each of multiple programs and identification information on a processing server for executing the program in association with each other; and an inquiry responding unit for, when receiving an inquiry from the processing server selecting unit, acquiring identification information on a processing server corresponding to identification information on a program for which the inquiry has been made, from the processing server information storing unit, and sends the identification information on a processing server as a reply.

(Item 3) The grid computing system according to item 2, wherein each of the multiple processing servers further comprises a caching unit for caching identification information on a processing server which the processing server selecting unit has acquired as a result of inquiry of the inquiry responding unit in the past, in association with identification information on a program to be executed by the processing server; and if identification information on a program to be executed is cached by the caching unit, the processing server selecting unit selects a processing server corresponding to the program, and if identification information on a program to be executed is not cached by the caching unit, the processing server selecting unit inquires of the inquiry responding unit about a processing server for executing the program.

(Item 4) The grid computing system according to item 2, wherein when receiving the input data, the program executing unit sends a receiving notification indicating that input data has been received to the management server, and when execution of the program is terminated, the program executing unit sends an termination notification indicating that execution of the program has been terminated; the processing server information storing unit further stores a result of determination made based on the receiving notification and the termination notification on whether or not it is possible for each of the multiple processing server to newly receive input data and execute a program, as executability information; and the inquiry responding unit selects, from among multiple processing servers for executing a program for which an inquiry has been made, a processing server capable of newly receiving input data and executing the program based on the executability information, and sends identification information on the selected processing server as a reply to the inquiry.

(Item 5) The grid computing system according to item 4, wherein the management server further comprises a program activating unit for, if processing servers more than a predetermined reference rate among the multiple processing servers for executing the program for which the inquiry responding unit has received an inquiry, are not capable of newly receiving input data and executing the program, activating the program on any of processing servers which have not activated the program yet; and the inquiry responding unit sends identification information on the processing server on which the program has been activated by the program activating unit, as a reply to the inquiry.

(Item 6) The grid computing system according to item 1, wherein each of the multiple processing servers comprises: a history storing unit for storing history of input data and execution direction sent by the input data transferring unit to the processing server; and a fault occurrence determining unit for determining whether or not any fault has occurred in execution of a program on a sending-destination processing server to which the input data transferring unit has sent the updated input data and execution direction; and if it is determined by the fault occurrence determining unit that a fault has occurred, the processing server selecting unit selects a different processing server for executing a program to be executed next as the updated input data as input; and the input data transferring unit acquires input data and execution direction from the history storing unit, and sends the input data and the execution direction to the different processing server selected by the processing server selecting unit.

(Item 7) The grid computing system according to item 6, wherein when receiving the input data, the program executing unit sends a receiving notification indicating that input data has been received to the management server, and when execution of the program is terminated, the program executing unit sends an termination notification indicating that execution of the program has been terminated; the management server further comprises a fault occurrence notification sending unit for, if the receiving notification is received from any processing server and, after that, the termination notification is not received within a predetermined reference processing time from the processing server, sending a fault occurrence notification indicating that a fault has occurred in execution of a program on the processing server to a sending-source processing server which has sent input data to the processing server; and the fault occurrence determining unit determines, if receiving the fault occurrence notification, that a fault has occurred in execution of a program on a sending-destination processing server to which the input data transferring unit has sent the updated input data and the execution direction.

(Item 8) The grid computing system according to item 6, wherein in a sending-destination processing server to which input data and execution direction have been sent, if newly receiving input data and determining that it is impossible to execute a program, the program executing unit sends a refusal notification indicating refusal of input data to a sending-source processing server which has sent the input data and the execution direction; and if receiving the refusal notification from the sending-destination processing server, the fault occurrence determining unit of the sending-source processing server determines that a fault has occurred in execution of a program on the sending-destination processing server.

(Item 9) The grid computing system according to item 6, wherein the management server further comprises a deletion directing unit for, if the job is completed by execution of the multiple programs, causing input data and execution direction to be deleted from the history storing section of each of the multiple processing server.

(Item 10) The grid computing system according to item 6, wherein in each of the multiple processing servers, the processing server selecting unit selects, from among multiple processing servers activating a program to be executed next with the updated input data as input, a processing server which communicates with the processing server with a higher communication speed as the different processing server in preference to a server with a lower communication speed.

(Item 11) The grid computing system according to item 1, wherein each of the multiple processing servers further comprises: a history storing unit for storing history information on data on the processing server which the program executing unit has changed by executing the program, in association with information which enables restoration to the state before the change; and a change restoring unit for, if a fault has occurred in execution of a program on a sending-destination processing server to which the input data transferring unit has sent the updated input data and execution direction, restoring data changed by the program executing unit to the original state based on the history information in the history storing unit.

(Item 12) The grid computing system according to item 1, wherein the management server further comprises a program activating unit for detecting each of programs to be executed for and after the second time with the input data to be inputted in the job as input, based on the generated execution direction, and activating each of the detected programs on any processing server different from the sending-destination server of the input data sending unit.

(Item 13) The grid computing system according to item 12, wherein in each of the multiple processing servers, the program executing unit notifies the management server of throughput required for execution of a program in the past; and in the management server, if the past throughput of a program notified by the program executing unit exceeds the maximum throughput to be processed by a processing server already activating the program, the program activating unit activates the program on any processing server different from the sending-destination server of the input data sending unit.

(Item 14) The grid computing system according to item 1, wherein the management server further comprises a program activating unit for detecting each of programs to be executed with the input data to be inputted in the job as input, and, for each of the detected programs, if throughput required for the program to be executed with the input data as input exceeds the maximum throughput to be processed by that a processing several ready activating the program, activates the program on any processing server different from the sending-destination server of the input data sending unit (Item 15) The grid computing system according to item 1, wherein if the program executing unit does not receive input data and execution direction within a predetermined reference waiting time after receiving input data and execution direction last, the program executing unit stops execution of a program by the processing server.

(Item 16) The grid computing system according to item 1, wherein the management server further comprises a processing server changing unit for, if the usage rate of computation resources to be used for execution of a program by the program executing unit is below a predetermined reference usage rate, causing a different processing server with a less maximum throughput than the processing server to execute the program.

(Item 17) The grid computing system according to item 1, wherein in a sending-destination processing server to which input data and execution direction have been sent, the program executing unit detects a program which should have been already executed on received input data, based on received execution direction, and executes the detected program if it is possible for the sending-source processing server to execute the program.

(Item 18) The grid computing system according to item 1, wherein in each of the multiple processing servers, the input data transferring unit creates a digital signature of the updated input data or the execution information, and sends the created digital signature in association with the input data and execution direction to be covered by the digital sign; and in a processing server which has received the input data, the execution direction and the digital signature, the program executing unit executes a program if the digital signature is correctly verified.

(Item 19) A management server in a grid computing system, for managing multiple processing servers, each of which executes a program assigned thereto from among multiple programs for processing multiple processing portions included in a job requested by a user; each of the multiple processing servers comprising: a program executing unit for, by executing the assigned program with received input data as input, updating the input data; a processing server selecting unit for selecting a different processing server for executing a program to be executed next with the updated input data as input, based on the execution direction received in association with the input data; and an input data transferring unit for sending the received execution direction and the updated input data in association with each other, to the processing server selected by the processing server selecting unit; and the management server comprising: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other.

(Item 20) A processing server managed by a management server in a grid computing system, the processing server executing a program assigned thereto from among multiple programs for processing multiple processing portions included in a job requested by a user; the management server comprising: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other; and the processing server comprising: a program executing unit for executing the assigned program with the received input data as input to update the input data; a processing server selecting unit for selecting a different processing server for executing a program to be executed next with the updated input data as input, based on the execution direction received in association with the input data; and an input data transferring unit for sending the received execution direction and the updated input data in association with each other, to the processing server selected by the processing server selecting unit.

(Item 21) A control method for controlling a management server in a grid computing system; the management server managing multiple processing servers, each of which executes a program assigned thereto from among multiple programs for processing multiple processing portions included in a job requested by a user; each of the multiple processing servers comprising: a program executing unit for, by executing the assigned program with received input data as input, updating the input data; a processing server selecting unit for a different selecting a processing server for executing a program to be executed next with the updated input data as input, based on the execution direction received in association with the input data; and an input data transferring unit for sending the received execution direction and the updated input data in association with each other, to the processing server selected by the processing server selecting unit; and the method comprising the steps of: generating execution direction including identification information identifying each of the multiple programs and the execution order of the multiple programs; and sending, to a processing server for executing a program to be executed first with input data to be inputted in the job as input, the input data and the execution direction in association with each other.

(Item 22) A control method for controlling a processing server managed by a management server in a grid computing system; the processing server executing a program assigned thereto from among multiple programs for processing multiple processing portions included in a job requested by a user; the management server comprising: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other; and the method comprising the steps of: executing the assigned program with the received input data as input to update the input data; selecting a different processing server for executing a program to be executed next with the updated input data as input, based on the execution direction received in association with the input data; and sending the received execution direction and the updated input data in association with each other, to the processing server selected at the processing server selection step.

(Item 23) A control program for causing a computer to function as a management server in a grid computing system; the management server managing multiple processing servers, each of which executes a program assigned thereto from among multiple programs for processing multiple processing portions included in a job requested by a user; each of the multiple processing servers comprising: a program executing unit for, by executing the assigned program with received input data as input, updating the input data; a processing server selecting unit for selecting a different processing server for executing a program to be executed next with the updated input data as input, based on the execution direction received in association with the input data; and an input data transferring unit for sending the received execution direction and the updated input data in association with each other, to the processing server selected by the processing server selecting unit; and the program causing the computer to function as: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other.

(Item 24) A control program for causing a computer to function as a processing server managed by a management server in a grid computing system, the processing server executing a program assigned thereto from among multiple programs for processing multiple processing portions included in a job requested by a user; the management server comprising: an execution direction generating unit for generating execution direction including identification information identifying each of the multiple programs and the execution order of the multiple programs; and an input data sending unit for sending, to a processing server for executing a program to be executed first with input data to be inputted in the job as input, the input data and the execution direction in association with each other; and the program causing the computer to function as: a program executing unit for executing the assigned program with the received input data as input to update the input data; a processing server selecting unit for selecting a different processing server for executing a program to be executed next with the updated input data as input, based on the execution direction received in association with the input data; and an input data transferring unit for sending the received execution direction and the updated input data in association with each other, to the processing server selected by the processing server selecting unit.

(Item 25) A recording medium on which the control program according to item 23 or 24 is recorded.

DESCRIPTION OF SYMBOLS

10 . . . grid computing system
20 . . . management server
30 . . . send data
40 . . . user terminal
50 . . . processing server
55 . . . database
200 . . . execution direction generating unit
210 . . . input data sending unit
220 . . . processing server information storing unit
230 . . . inquiry responding unit
240 . . . program activating unit
250 . . . fault occurrence notification sending unit
260 . . . processing server changing unit
270 . . . deletion directing unit
300 . . . execution direction
500 . . . program executing unit
510 . . . processing server selecting unit
520 . . . caching unit
530 . . . input data transferring unit
540 . . . history storing unit
550 . . . fault occurrence determining unit
560 . . . change restoring unit

The invention claimed is:

1. A system comprising multiple processing servers and a management server for managing the multiple processing servers, each processing server adapted to execute a program assigned thereto from among multiple programs for performing a requested job;

the management server comprising:
  a first computer processor;
  an execution direction generating unit for generating via the first computer processor, an execution direction, said execution direction including identification information identifying each of the multiple programs, input and/or output files for each of the multiple programs, and an execution order of the multiple programs for performing the requested job, said execution order identifying a first program of the multiple programs to be executed before any other program of the multiple programs is executed;
  an input data sending unit for sending via the first computer processor, input data and the execution direction to a first processing server of the multiple processing servers for executing the first program with the input data;
  a processing server information storing unit for storing via the first computer processor, identification information identifying each program of the multiple programs and identification information on each processing server for executing the program assigned to each processing server;

an inquiry responding unit for acquiring via the first computer processor, identification information from the processing server information storing unit and for sending the identification information to an inquiring processing server of the multiple processing servers in response to an inquiry for said identification information received from the inquiring processing server after the inquiring processing server has completed execution of the program assigned thereto, said identification information identifying a next processing server to execute a next program included in the execution direction; and each processing server of the multiple processing servers comprising:

a second computer processor;

a program executing unit for executing via the second computer processor, the assigned program using received input data and for updating the input data following said executing the assigned program;

a processing server selecting unit for sending via the second computer processor, to the management server, an inquiry for identification information identifying a next processing server to execute the next program included in the execution direction after said each processing server has completed execution of the program assigned thereto; and an input data transferring unit for sending via the second computer processor, to the next processing server identified in the identification information received by the processing server selecting unit from the management server in response to said inquiry, the received execution direction and updated input data.

2. The system of claim 1,
wherein each processing server of the multiple processing servers further comprises a caching unit for caching via the second computer processor, said identification information of said next processing server which the processing server selecting unit of said each processing server has acquired as a result of said inquiry;
wherein the identification information is cached by the caching unit; and
wherein the processing server selecting unit selects via the second computer processor, the next processing server to execute the next program.

3. The system of claim 1,
wherein in response to receiving the input data, the program executing unit sends via the second computer processor, a receiving notification indicating that input data has been received to the management server, and in response to terminating execution of the assigned program, the program executing unit sends an termination notification indicating that execution of the assigned program has been terminated;
wherein the processing server information storing unit stores via the first computer processor, executability information based on the receiving notification and the termination notification on whether or not it is possible for each processing server of the multiple processing servers to newly receive input data and execute its assigned program; and
wherein the inquiry responding unit selects via the first computer processor, the next processing server to execute the next program.

4. The system of claim 3,
wherein the management server further comprises a program activating unit for, on condition that more than a predetermined percentage of the processing servers are not capable of newly receiving input data and executing the next program, activating via the first computer processor, the next program on one processing server which has not activated the next program; and
wherein the inquiry responding unit sends via the first computer processor, identification information of the one processing server on which the next program has been activated by the program activating unit.

5. The system of claim 1,
wherein each processing server of the multiple processing servers comprises:
a history storing unit for storing via the second computer processor, history of the input data and the execution direction sent by the input data transferring unit to the processing server; and
a fault occurrence determining unit for determining via the second computer processor, whether or not any fault has occurred in execution of a program on a sending-destination processing server to which the input data transferring unit has sent the updated input data and the execution direction;
wherein in response to determining by the fault occurrence determining unit that said any fault has occurred, the processing server selecting unit selects via the second computer processor, a different processing server for executing the next program to be executed next; and
wherein the input data transferring unit acquires via the second computer processor, the input data and the execution direction from the history storing unit to send the input data and the execution direction to the different processing server selected by the processing server selecting unit.

6. The system of claim 5,
wherein in response to receiving the input data, the program executing unit sends via the second computer processor, a receiving notification indicating that input data has been received from the management server,
wherein in response to terminating execution of the assigned program, the program executing unit sends via the second computer processor, an termination notification to the management server indicating that execution of the assigned program has been terminated; and
wherein the management server further comprises a fault occurrence notification sending unit for, if the receiving notification is received from any processing server and, after that, the termination notification is not received within a predetermined reference processing time from said any processing server, sending via the first computer processor, a fault occurrence notification indicating that a fault has occurred in execution of a program on said any processing server to a sending-source processing server which has sent the input data to said any processing server; and
wherein the fault occurrence determining unit determines via the second computer processor, if receiving the fault occurrence notification, that a fault has occurred in execution of a program on a sending-destination processing server to which the input data transferring unit has sent the updated input data and the execution direction.

7. The system of claim 5,
wherein in response to receiving the input data and execution direction by a sending-destination processing server, on determining that it is impossible to execute a program, the program executing unit of the sending-destination processing server sends via the second computer processor, a refusal notification indicating refusal of the input data to a sending-source processing server which has sent the input data and the execution direction to the sending-destination processing server; and wherein in response to receiving the refusal notification from the sending-destination processing server, the fault occurrence determining unit of the sending-source processing server determines via the second computer processor, that a fault has occurred in execution of a program on the sending-destination processing server.

8. The system of claim 5, wherein the management server further comprises a deletion directing unit for, on condition that the job is completed by execution of the multiple programs, causing via the first computer processor, the input data and the execution direction to be deleted from the history storing section of each processing server of the multiple processing servers.

9. The system of claim 5, wherein the processing server selecting unit of each processing server of the multiple processing servers selects via the second computer processor, from among processing servers activating a program to be executed next with the updated input data, a processing server which communicates with the processing server with a higher communication speed as the different processing server in preference to a server with a lower communication speed.

10. The system of claim 1, wherein each processing server of the multiple processing servers further comprises:
- a history storing unit for storing via the second computer processor, history information on data on the processing server which the program executing unit has changed by executing the program, in association with information which enables restoration to the state before the program executing unit has changed; and
- a change restoring unit for via the second computer processor, if a fault has occurred in execution of a program on a sending-destination processing server to which the input data transferring unit has sent the updated input data and execution direction, restoring data changed by the program executing unit to the original state of the changed data based on the history information in the history storing unit.

11. The system of claim 1, wherein the management server further comprises a program activating unit for detecting via the first computer processor, each of programs to be executed for and after the second time using the input data, based on the execution direction, and activating each of the detected programs on any processing server different from the sending-destination server of the input data sending unit.

12. The system of claim 11,
wherein the program executing unit of each processing server of the multiple processing servers notifies via the second computer processor, the management server of throughput required for execution of a program in the past; and
wherein the program activating unit of the management server activates via the first computer processor, on condition that the past throughput of a program notified by the program executing unit exceeds the maximum throughput to be processed by a processing server already activating the program, the program on any processing server different from the sending-destination server of the input data sending unit.

13. The system of claim 1, wherein the management server further comprises a program activating unit for detecting via the first computer processor, each of programs to be executed using the input data and, for each of the detected programs, on condition that throughput required for the program to be executed with the input data exceeds the maximum throughput to be processed by a processing server already activating the program, activates the program on any processing server different from the sending-destination server of the input data sending unit.

14. The system of claim 1, wherein on condition that the program executing unit does not receive the input data and execution direction within a predetermined reference waiting time after receiving input data and execution direction, the program executing unit stops execution via the second computer processor, of a program by the processing server that is executing the program.

15. The system of claim 1, wherein the management server further comprises a processing server changing unit for, on condition that the usage rate of computation resources to be used for execution of a program by the program executing unit is below a predetermined reference usage rate, causing via the first computer processor a different processing server with a less maximum throughput than that of the processing server to execute the program.

16. The system of claim 1, wherein in response to receiving input data and execution direction by a sending-destination processing server, the program executing unit detects via the second computer processor, that there still exists a program which should have been already executed based on received execution direction, and executes the detected program on condition that it is possible for the sending-source processing server to execute the program.

17. The system of claim 1,
wherein the input data transferring unit of each processing server of the multiple processing servers creates via the second computer processor, a digital signature of the updated input data or the execution information to send the created digital signature in association with the input data and execution direction to be covered by the digital signature; and
wherein the program executing unit of a processing server executes via the second computer processor, a program on condition that the digital signature is correctly verified.

18. A management server for managing multiple processing servers, each processing server adapted to execute a program assigned thereto from among multiple programs for performing a requested job, the management server comprising:
- a computer processor;
- an execution direction generating unit for generating via the computer processor, an execution direction, said execution direction including identification information identifying each of the multiple programs, input and/or output files for each of the multiple programs, and an execution order of the multiple programs for performing the requested job, said execution order identifying a first program of the multiple programs to be executed before any other program of the multiple programs is executed;
- an input data sending unit for sending via the computer processor, input data and the execution direction to a first processing server of the multiple processing servers for executing the first program with the input data;
- a processing server information storing unit for storing via the computer processor, identification information identifying each program of the multiple programs and identification information on each processing server for executing the program assigned to each processing server;

an inquiry responding unit for acquiring via the computer processor, identification information from the processing server information storing unit and for sending the identification information to an inquiring processing server of the multiple processing servers in response to an inquiry for said identification information received from the inquiring processing server after the inquiring processing server has completed execution of the program assigned thereto, said identification information identifying a next processing server to execute a next program included in the execution direction.

19. A method for performing a requested job by a system that comprises multiple processing servers and a management server for managing the multiple processing servers, each processing server adapted to execute a program assigned thereto from among multiple programs for performing the requested job, said method comprising:

generating, by the management server, an execution direction, said execution direction including identification information identifying each of the multiple programs, input and/or output files for each of the multiple programs, and an execution order of the multiple programs for performing the requested job, said execution order identifying a first program of the multiple programs to be executed before any other program of the multiple programs is executed;

sending, by the management server to a first processing server of the multiple processing servers, the execution direction and input data for subsequent execution of the first program;

executing, by the first processing server, the first program using the input data as input, wherein said executing the first program results in said input data being updated;

after said executing the first program, sending, by the first processing server to the management server, an inquiry for identification information that identifies a second processing server to execute a second program included in the execution direction;

after sending the inquiry, receiving, by the first processing server from the management server, the identification information; and sending, by the first processing server to the second processing server, the execution direction and the updated input data for subsequent execution of the second program.

20. The method of claim 19, further comprising after said receiving the execution direction and input data:

sending, by the first processing server to the management server, a receiving notification indicating that the first processing server has received the execution direction and input data sent by the management server.

21. The method of claim 19, further comprising after completion of said executing the first program:

sending, by the first processing server to the management server, a termination notification indicating that the first processing server has completed execution of the first program.

22. The method of claim 19, wherein after said sending, by the first processing server to the second processing server, the execution direction and the updated input data for subsequent execution of the second program, the second processing server is designated as a current processing server, the second program is designated as a current program, and the updated input data is designated as current input data, and the method further comprises executing a loop that comprises at least one iteration such that executing the loop comprises performing each iteration of the at least one iteration, wherein each iteration when performed is designated as a current iteration, and wherein performing each iteration of the loop comprises:

if the current processing server is unable to execute the current program then not executing the current program by the current processing server, otherwise initiating execution of the current program by the current processing server using the current input data as input which results either in completion of executing the current program by the current processing server with the current input data being updated or an occurrence of a fault during said executing the current program by the current processing server;

if said execution of the current program by the current processing server is initiated and completed, then after completion of executing the current program by the current processing server: sending, by the current processing server to the management server, either a completion notification to indicate that performance of the requested job has been completed or an inquiry for identification information that identifies a next processing server to execute a next program included in the execution direction;

if the inquiry has been sent then after said sending the inquiry and receipt thereof by the management server:
sending, by the management server to the current processing server, the identification information; and
sending, by the current processing server to the next processing server, the execution direction and the updated input data for subsequent execution of the next program to end the current iteration, wherein for the next iteration is to be performed: the next processing server is designated as the current processing server, the next program is designated as the current program, and the updated input data is designated as the current input data.

23. The method of claim 22, wherein during an individual iteration of the at least one iteration said execution of the current program by the current processing server is initiated and completed.

24. The method of claim 23, wherein the individual iteration is the last iteration of the at least one iteration and during said last iteration after said completion of said executing the current program by the current processing server, said sending the completion notification by the current processing server to the management server is performed.

25. The method of claim 23, wherein during the individual iteration after said completion of said executing the current program by the current processing server is performed, said sending the inquiry by the current processing server to the management server is performed.

26. The method of claim 22, wherein during an individual iteration of the at least one iteration either the current processing server is unable to execute the current program or said execution of the current program by the current processing server is initiated such that said fault occurs during said executing the current program by the current processing server, and wherein the method further comprises during said individual iteration:

sending, by the current processing server to a prior processing server that had sent the execution direction and the updated input data to the current processing server, a refusal notification indicating refusal of the updated input data;

sending, by the prior processing server to the management server, an inquiry for different identification information that identifies a different processing server to execute the next program included in the execution direction;

sending, by the management server to the prior processing server, the different identification information; and sending, by the prior processing server to the different processing server, the execution direction and the updated input data for subsequent execution of the next program during the individual iteration such that the different processing server is designated as the current processing server during the individual iteration.

27. The method of claim 26, wherein during the individual iteration, the current processing server is unable to execute the current program.

28. The method of claim 26, wherein during the individual iteration, said execution of the current program by the current processing server is initiated such that said fault occurs during said executing the current program by the current processing server.

29. The method of claim 22, wherein during an individual iteration of the at least one iteration said execution of the current program by the current processing server is initiated such that said fault occurs during said executing the current program by the current processing server, wherein the current processing server is unable to send a refusal notification to a prior processing server that had sent the execution direction and the updated input data to the current processing server, wherein the refusal notification if sent would have indicated refusal of the updated input data, and wherein the method further comprises during said individual iteration:

determining, by the management server, that said fault has occurred;

sending, by the management server to the prior processing server, a fault occurrence notification indicating that said fault has occurred;

selecting, by the management server a different processing server to execute the next program included in the execution direction; and sending, by the prior processing server to the different processing server, the execution direction and the updated input data for subsequent execution of the next program during the individual iteration such that the different processing server is designated as the current processing server during the individual iteration.

30. The method of claim 22, wherein during an individual iteration of the at least one iteration said execution of the current program by the current processing server is initiated such that said fault occurs during said executing the current program by the current processing server, and wherein the method further comprises during said individual iteration:

determining, by the management server, that said fault has occurred and that the requested job cannot be performed by avoiding said fault; and sending, by the management server to all prior servers that have performed a prior execution of a program of the multiple programs during any prior iteration of the at least one iteration, a restoration directive to restore all data changed during said prior execution by said all prior servers.

31. A system comprising a plurality of processing servers and a managing server for managing the multiple processing servers, said system adapted to perform the method of claim 19 via a first computer processor comprised by the managing server and a second computer processor comprised by each processing server of the plurality of processing servers, wherein the plurality of processing servers consists of the multiple processing servers, and wherein the managing server consists of the management server.

32. Storage media, comprising a computer readable control programs embodied therein, said control programs adapted to be executed by a managing server and a plurality of processing servers to perform the method of claim 19, wherein the plurality of processing servers consists of the multiple processing servers, and wherein the managing server consists of the management server.

* * * * *